(12) United States Patent  
Nakamrura

(10) Patent No.: US 6,977,340 B2  
(45) Date of Patent: Dec. 20, 2005

(54) GROMMET AND GROMMET-MOUNTING STRUCTURE

(75) Inventor: Yoshio Nakamrura, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/730,280

(22) Filed: Dec. 9, 2003

(65) Prior Publication Data

US 2005/0061531 A1 Mar. 24, 2005

(30) Foreign Application Priority Data

| Dec. 9, 2002 | (JP) | ............................. P.2002-356930 |
| Dec. 9, 2002 | (JP) | ............................. P.2002-357272 |
| Dec. 17, 2002 | (JP) | ............................. P.2002-365714 |

(51) Int. Cl.[7] ............................................. H02G 3/18
(52) U.S. Cl. .................. 174/65 G; 174/135; 174/65 R; 16/2.1; 248/56
(58) Field of Search ............................ 174/65 G, 65 R, 174/135, 64, 152 G, 153 G; 16/2.1, 2.2; 248/56

(56) References Cited

U.S. PATENT DOCUMENTS 6,218,625 B1 * 4/2001 Pulaski .................. 174/153 G 6,768,054 B2 * 7/2004 Sato et al. ..................... 174/50

FOREIGN PATENT DOCUMENTS

| JP | 3-112984 U | 11/1991 |
| JP | 3-126315 U | 12/1991 |
| JP | 4-72424 U | 6/1992 |
| JP | 4-85525 U | 7/1992 |
| JP | 8-31251 A | 2/1996 |
| JP | 8-251769 A | 9/1996 |
| JP | 2001-52551 A | 2/2001 |
| JP | 2001-69645 A | 3/2001 |
| JP | 2001-231132 A | 8/2001 |

* cited by examiner

*Primary Examiner*—Dhiru R. Patel  
(74) *Attorney, Agent, or Firm*—Sughrue Mion, PLLC

(57) ABSTRACT

A grommet for gripping an elongated member includes a first resin-molded division member, and a second resin-molded division member for mounting on the first resin-molded division member. Each of the first and second resin-molded division members includes a polyamide resin. An elastic seal member, including an elastomer, is formed integrally on at least one of the first and second resin-molded division members by insert molding. The grommet includes a joining portion which prevents the elastic seal member from being separated from the one resin-molded division member.

9 Claims, 21 Drawing Sheets

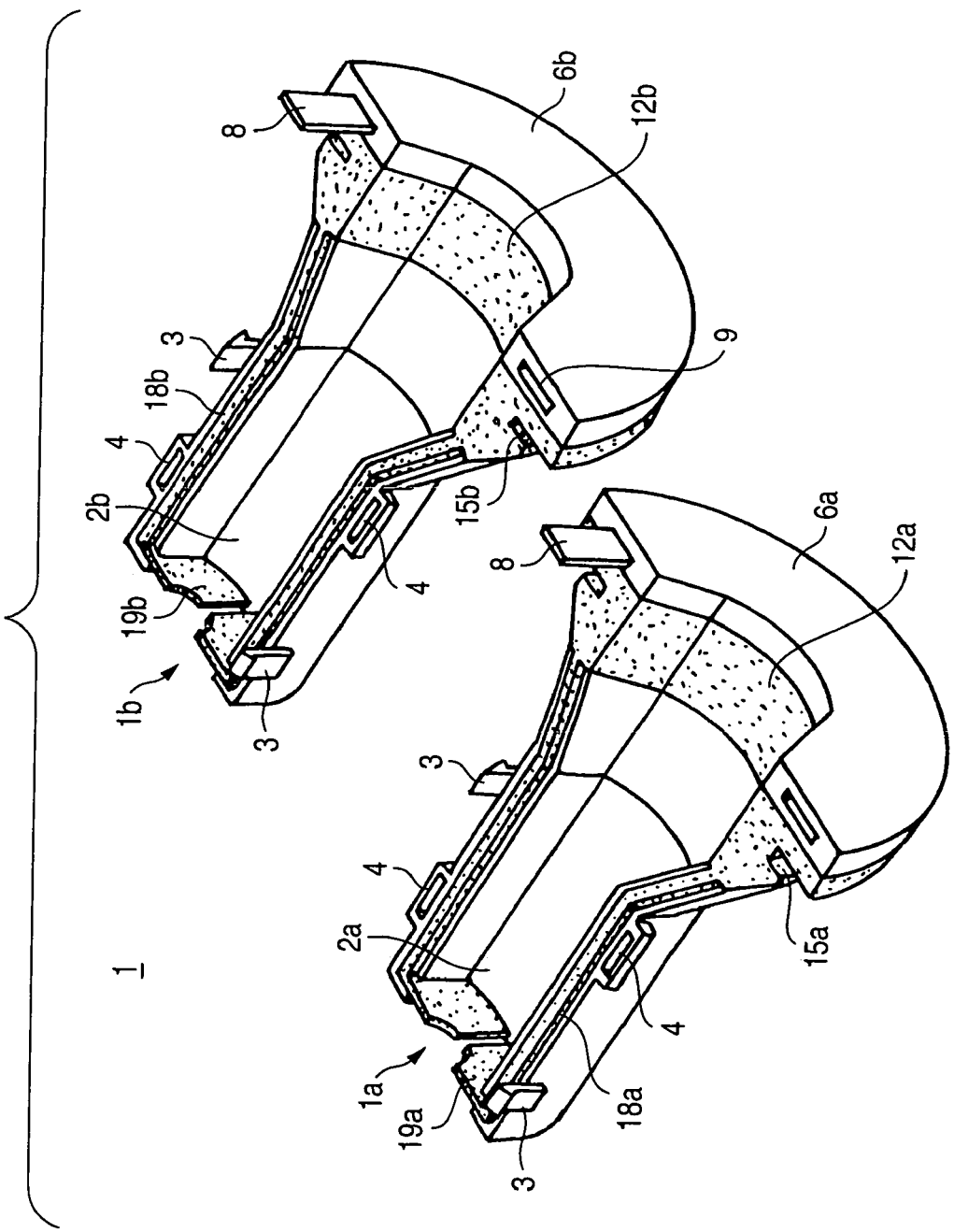

GROMMET AND GROMMET-MOUNTING STRUCTURE

BACKGROUND OF THE INVENTION

This invention relates to a grommet which prevents an elongated member such as a wire harness, passing through an opening portion formed in a mounting member, from contacting with the opening portion, and also prevents the intrusion of water through a gap between the opening portion and the elongated member.

The invention also relates to a grommet which is mounted on a waterproof box containing a control unit or the like, and is used to cause a wire harness to be extended outwardly from the waterproof box.

The invention further relates to a grommet and a grommet-mounting structure.

For example, when an elongated member, such as a wire harness, is to be passed through an opening portion formed in a mounting member such as a car body panel of an automobile and an electric connection box, a grommet is used in order to prevent the wire harness from contacting the opening portion and also to prevent the intrusion of water through a gap.

In recent years, usually, the whole of a grommet of this kind has been molded into an integral construction, using a soft (flexible) elastic material such as synthetic rubber.

However, when a wire harness or the like is to be passed through such a grommet entirely molded into an integral construction by the use of a soft elastic material, the diameter of the grommet must be expanded, and this operation requires much time and labor, and therefore was cumbersome.

Therefore, in order to deal with this problem, there has been proposed a grommet enabling a wire harness or the like to be easily passed therethrough (see, for example, pages 3 and 4 and FIGS. 1 to 4 of JP-A-8-31251). In this grommet, a grommet body is made of a rigid material such as a rigid plastics material, and is divided to have a two-piece construction. Soft elastic members for waterproof sealing purposes are provided respectively at parting surfaces of division members and contact surfaces of the division members for contact with an opening portion.

A grommet 1, shown in FIG. 22, includes a pair of division members 1a and 1b separated from each other in a plane in which a longitudinal axis of the grommet lies. Each of the division members 1a and 1b is molded into an integral construction, and includes a half-cylindrical division member 2a, 2b, a half-annular division member 6a, 6b, and an elastic division member 12a, 12b.

The half-cylindrical division members 2a and 2b are mated together at their parting surfaces to form a generally cylindrical body, and include a lock mechanism having retaining claws 3 and retaining hole portions 4 formed integrally therewith. The half-cylindrical division members 2a and 2b are injection molded of a rigid plastics material such for example as polypropylene.

The half-annular division members 6a and 6b are mated together at their parting surfaces to form an annular body, and a guide projection 8 and a guide hole 9 are formed at the parting surface of each of these division members. The half-annular division members 6a and 6b are injection molded of a rigid plastics material as described for the half-cylindrical division members.

The elastic division member 12a interconnects the half-annular division member 6a and the half-cylindrical division member 2a, while the elastic division member 12b interconnects the half-annular division member 6b and the half-cylindrical division member 2b. Each of the elastic division members 12a and 12b is made of a soft elastic material such as rubber and a plastics elastomer.

Half-annular grooves 15a and 15b for fitting a peripheral edge portion of the opening portion formed in a car body panel are formed in outer peripheral surfaces of the elastic division members 12a and 12b, respectively. Ridge-like seal portions 18a, 18b extending along the parting surface of the half-cylindrical division member 2a, 2b, and a seal tongue 19a, 19b are formed integrally on each of the elastic division members 12a and 12b.

As the soft elastic material, there can be used an olefin elastomer or a plastics elastomer (such as a styrene elastomer) which has good compatibility with the plastics material (such as polypropylene) of which the half-cylindrical division members 2a and 2b and the half-annular division members 6a and 6b are made. There is used a so-called double injection-molding method in which the half-cylindrical division member 2a, 2b and the half-annular division member 6a, 6b are put in a cavity of a mold which corresponds in shape to a half of the grommet, and a molten elastic material is poured into this cavity.

The grommet 1 of the above construction in a divided condition grips the wire harness (not shown), and then the division members 1a and 1b are mated together, and are fastened together into an integral condition into by the lock mechanism. At this time, the ridge-like seal portions 18a and 18b, provided at the parting surfaces of the half-cylindrical division members 2a and 2b, abut against each other to be squeezed, and therefore there is no fear that a gap is formed between the mated parting surfaces.

Further, the grommet, thus assembled into the integral condition, is passed through the opening portion (not shown) in the car body panel, with the half-cylindrical division members 2a and 2b first fitted thereinto, and the peripheral edge portion of this opening portion is fitted into the half-annular grooves 15a and 15b formed respectively in the elastic division members 12a and 12b.

As a result, the elastic division members 12a and 12b, each made of the soft elastic material, are held in intimate contact with the opening portion in the car body panel, thereby preventing the intrusion of water through a gap between the grommet 1 and the opening portion.

Incidentally, wire harnesses are installed all over a car body, and therefore it is difficult to remove the wire harnesses from the car body when discarding them. Therefore, in many cases, these wire harnesses are crushed together with the car body and others, and are broken into pieces by a shredder. In recent years, however, it has been required to reduce the amount of shredder dust from the viewpoint of an ecological problem, and also it has been required to recover scrap iron, non-ferrous metals, resins and others in an assorted manner so that the resources can be easily efficiently used.

However, usually, the wire harness includes wires, terminals, connectors, grommets and an insulating tape, and when these parts are crushed together with the car body, and are broken into pieces by a shredder, the different materials are mixed together, so that it is difficult to recover these materials in an assorted manner.

Therefore, before the above crushing step, the wire harness is removed from the car body, and also the parts (including the wires, the terminals, the connectors and the grommets) made of different materials, are removed from the wire harness as much as possible.

However, in the case of the grommet 1 shown in FIG. 22, the half-cylindrical division member 2a, 2b and half-annular division member 6a and 6b which are made of the plastics material are insert molded (double injection molding) in the elastic division member 12a, 12b made of the elastomer having good compatibility with the plastics material, and therefore these bodies are firmly bonded together.

Therefore, when the elastic division member 12a, 12b is to be separated from the half-cylindrical division member 2a, 2b and the half-annular division member 6a, 6b for recovering purposes so as to effect the above recycling process, the bonded portions could not be easily separated from each other, which invited a problem that the efficiency of this operation is low.

One related grommet, used in a waterproof box containing a control unit or the like, is disclosed, for example, in JP-UM-A-3-126315. In this grommet 180, a second thickened peripheral wall portion 183 is formed at a central portion of bellows-like trunk portion 182 of a grommet body 181, and a fitting groove 184 and a guide projection 185 (which serve as fitting portions for rigid plates) are formed at an outer surface of the second thickened peripheral wall portion 185, as shown in FIGS. 23A and 23B.

A first thickened peripheral wall portion 187, formed at a front end of the grommet body, is similar in shape to the second thickened peripheral wall portion, and is one size larger than it. A fitting groove 188 (serving as a fitting portion for a rigid member) is formed in an inner peripheral surface of the first thickened peripheral wall portion 187. An upper end lip 189 is formed on an outer surface of the first thickened peripheral wall portion 187.

In this grommet 180, the rigid member is fitted in the inner peripheral surface of the first thickened peripheral wall portion 187 formed at the front end of the grommet body 181, and retaining claws of this rigid member are retainingly engaged respectively in frame-like retaining portions of a lower case, and a slide projection 190 and a slide peripheral groove 191 of the first thickened peripheral wall portion 187 are fitted relative to a guide groove and a guide projection of the lower case, respectively.

An upper case, having a packing for the upper end lip 189, is provided on the upper side of the first thickened peripheral wall portion 187 to cover the same.

The fitting groove 183 and guide projection 185 of the second thickened peripheral wall portion 183, formed at the central portion of the grommet body, are fitted in a fitting groove, and retaining claws of the lower rigid plate are engaged respectively in frame-like retaining portions of a wall plate such as a heat-insulating plate. An upper wall is fitted relative to the upper rigid plate to be fixed thereto.

In this grommet, however, when the grommet body is to be fitted relative to the lower case, a large inserting force is required for fitting the relevant resin-molded portions together, and therefore there was encountered a problem that the efficiency of the operation was low.

Incidentally, there is already known a relief apparatus for transmitting a relief signal from a submerged vehicle. As shown in FIGS. 24 and 25, such a relief apparatus comprises a detection device 201 for detecting the intrusion of water into the interior of the vehicle, a transmitting device 202 for transmitting a relief signal in response to the detection signal from the detection device 201, and a wire harness 203 connecting the detection device 201 and the transmitting device 202 together.

The transmitting device 202 is received within a waterproof box 205 provided, for example, below a seat 204 of the vehicle. The waterproof box 205 includes a box body 205a having a notch portion 206, and a lid 205b, and the wire harness 203 is extended into the interior of the waterproof box 205 through the notch portion 206, and is connected to the transmitting device 202.

As shown in FIG. 26, a water-stop agent 203b is filled in a predetermined portion of a bundle of (many) wires 203a forming the wire harness 203, and thereafter an adhesive tape 203c is wound on the bundle of wires 203a to cover the same, and that portion of the wire bundle in which the water-stop agent 203b is filled serves as a water-stop portion. A grommet 207, mounted on this water-stop portion, is located at the notch portion 206.

The grommet 207 includes a division member body 207a and a seal portion 207b which are separated from each other along a plane parallel to an axis of a tubular grip portion 208 for gripping the water-stop portion in a circumferential direction, and the division member body 207a and the seal portion 207b are releasably combined together (see, for example, JP-A-8-251769).

The water-stop portion of the wire harness 203 is gripped by the grip portion 208 of the grommet 207 in the circumferential direction, and in this condition the seal portion 207b of the grommet 207 is fitted into the notch portion 206 formed in the box body 205a of the waterproof box 205, and the lid 205b is locked to the box body 205a. Thus, the grommet 207 is located at the notch portion 206 of the waterproof box 205.

When the grommet 207 is located at the notch portion 206 of the waterproof box 205, a seal between the grommet 207 and the notch portion 206, a seal between the grommet 207 and the wire harness 203, and a seal at the water-stop portion are formed. With respect to the waterproof seal between the grommet 207 and the wire harness 203, a waterproof member is interposed between the division member body 207a and seal portion 207b of the grommet 207, and the division member body 207a and the seal portion 207b are fastened together by retaining piece portions and retaining portions provided at opposed portions thereof, thereby securing the waterproof effect.

When the waterproof member is interposed between the division member body 207a and the seal portion 207b, there is a fear that the division member body 207a and the seal portion 207b are fastened together, with the waterproof member twisted or disposed out of position.

In such a case, the operator cancels the retaining engagement between each retaining piece portion and the corresponding retaining portion (which are retainingly engaged with each other at a position concealed from the operator's view), and then puts the waterproof member into the predetermined position and posture by the hand or others so as to secure the desired waterproof effect. Therefore, there is encountered a problem that the efficiency of the operation is low.

SUMMARY OF THE INVENTION

Therefore, this invention seeks to solve the above problems, and an object of the invention is to provide a grommet in which an elastic seal member, provided on a resin-molded division member, can be easily separated therefrom at the time of disassembling the grommet so that the grommet has a good recycling ability.

A second object of the invention is to provide a grommet which can be easily mounted on a case while securing a good waterproof performance.

A third object of the invention is to provide a grommet and a grommet mounting structure, in which the efficiency of an operation for combining a first division member and a second division member together is enhanced.

According to the present invention, there is provided a grommet for holding an elongated member, comprising:

a first resin-molded division member; and a second resin-molded division member for mounting on the first resin-molded division member, wherein each of the first and second resin-molded division members includes a polyamide resin;

wherein an elastic seal member, including an elastomer, is integrally formed on at least one of the first and second resin-molded division members by insert molding; and wherein the grommet includes a joining portion which prevents the elastic seal member from being separated from the one resin-molded division member.

Preferably, the joining portion includes a through hole formed in the one division member, and a portion of the elastic seal member which extends through the through hole, and is fixed to the one division member.

In the above construction, one of the pair of resin-molded division members which are combined together to hold the elongated member is made of the polyamide resin, and the elastic seal member, formed integrally on this resin-molded division member by insert molding, is made of the elastomer. The elastic seal member has the joining portion which extends through this resin-molded division member.

The resin-molded division member and the elastic seal member (which is insert molded on this division member body) are molded respectively of the polyamide resin and the elastomer which have poor compatibility with each other, and the bonded portions of the two are liable to be separated. Despite this, the withdrawal prevention portion, formed at the elastic seal portion, prevents the separation and displacement of the elastic seal member.

At the time of a recycling process in which the resin-molded division member and the elastic seal member are assorted, the elastic seal member can be easily removed from the resin-molded division member by breaking the withdrawal prevention portion, and therefore the efficiency of the assorting operation is enhanced.

Therefore, there can be provided the grommet in which the elastic seal member, provided on the resin-molded division member, can be easily separated therefrom at the time of disassembling the grommet so that the grommet has a good recycling ability.

Preferably, the grommet is fitted in an opening portion formed in a waterproof box including a box body and a lid. When the grommet is fitted in the opening portion notched in an end edge of an opening of the box body, the elongated member is passed through the opening portion in a sealed condition.

In this case, there can be obtained the waterproof box provided with the grommet which enables a wire harness to be easily passed therethrough, and has a good waterproof ability and can be easily processed for recycling purposes.

According to another aspect of the invention, there is provided a grommet for the passage of a wire harness therethrough and for mounting on a waterproof box including a box body and a lid member for fitting on the box body, the box body having a notch opening portion, the grommet comprising;

a waterproof rib, abutting against a peripheral wall portion of an upper edge portion of the box body which defines opposite ends of the notch opening portion, wherein when the lid member is fitted on the box body, the waterproof rib is pressed toward the inside of the box body.

In the above construction, the grommet can be mounted in the notch opening portion of the box body with a low insertion force. And besides, when the lid member is fitted on the box body, the waterproof rib is pressed against the peripheral wall, and therefore a good waterproof seal is formed between the grommet and the box body.

Preferably, the waterproof rib extends in a direction of mounting of the wire harness onto the grommet.

In the above construction, the waterproof rib abut against the peripheral wall (disposed near to the notch opening portion) over a region extending from the upper edge to lower edge of the peripheral wall, and therefore when the lid member is fitted on the box body, the waterproof rib is pressed against the peripheral wall, thereby forming the more positive seal between the grommet and the box body.

According to a further aspect of the invention, there is provided a grommet for holding a wire harness, comprising:

a first division member;

a second division member;

a retaining member, retaining the first division member to the second division member so that opposed portions of the first and second division members are spaced from each other; and a fixing member, retaining the first division member to a mounting member, wherein when the second retaining member retains the first division member to the mounting member, the first and second division members are fixed in an integrally-connected manner to the waterproof box so that the opposed portions of the first and second division members are held in intimate contact with each other.

Preferably, the mounting member is a waterproof box receiving one end portion of the wire harness.

Preferably, the retaining member includes a retaining portion formed on one of the opposed portions of the first and second division members, and a retaining piece portion formed on the other opposed portion. The fixing member includes a lock arm extending from one of an outer face of the first division member and the mounting portion beyond the second division member, and a retaining projection which is formed on the other of the outer face of the first division member and the mounting portion so as to be engaged with the lock arm.

In the above construction, the retaining member provisionally retain the first and second division members to each other, and therefore a gap can be formed between the first and second division members. Therefore, even when a waterproof member, provided between the first and second division members, is not interposed in a predetermined position or a predetermined shape therebetween, the desired waterproof effect can be achieved by correcting the position and posture of the waterproof member with the hands of the operator in the mutually-combined condition of the first and second division members or by self-restoring of this waterproof member into its original shape because of its elastic restoring force. Therefore, the efficiency of the operation for combining the first and second division members together can be enhanced.

Then, simultaneously when the first and second division members are completely combined together by the fixing members, the grommet is fixed to the waterproof box.

Therefore, this grommet solves the problem encountered with the related grommet in which the efficiency of the operation for combining the first and second division members together is low.

According to a further aspect of the invention, there is provided a grommet mounting structure, comprising:

a wire harness;

a grommet, including a first division member and a second division member for holding the wire harness; and a waterproof box, to which the grommet is fixed, wherein the grommet includes:

a retaining member which retains the first and second division members so that opposed portions of the first and second division members are spaced from each other; and a fixing member which retains the first division member to a mounting member; and wherein when the fixing member retain the first division member to the mounting member, the first and second division members are fixed in an integrally-connected manner to the mounting member so that the opposed portions of the first and second division members are held in intimate contact with each other.

In the grommet mounting structure of this construction, the retaining member provisionally retain the first and second division members to each other, and therefore a gap can be formed between the first and second division members. Therefore, even when a waterproof member, provided between the first and second division members, is not interposed in a predetermined position or a predetermined shape therebetween, the desired waterproof effect can be achieved by correcting the position and posture of the waterproof member with the hands of the operator in the mutually-combined condition of the first and second division members or by self-restoring of this waterproof member into its original shape because of its elastic restoring force. Therefore, the efficiency of the operation for combining the first and second division members together can be enhanced.

Then, simultaneously when the first and second division members are completely combined together by the fixing members, the grommet is fixed to the waterproof box.

Therefore, this grommet mounting structure solves the problem encountered with the related grommet in which the efficiency of the operation for combining the first and second division members together is low.

BRIEF DESCRIPTION OF THE DRAWINGS

FIG. 19A is a cross-sectional view showing a condition before a water-stop portion of a wire harness is gripped by a grip portion of the grommet, and FIG. 19B is a cross-sectional view showing a condition after the water-stop portion of the wire harness is gripped by the grip portion of the grommet;

FIG. 22 is an exploded, perspective view of a related grommet;

DETAILED DESCRIPTION OF THE PREFERRED EMBODIMENTS

A grommet according to a first embodiment of the present invention will now be described in detail with reference to the accompanying drawings.

Figure 1:
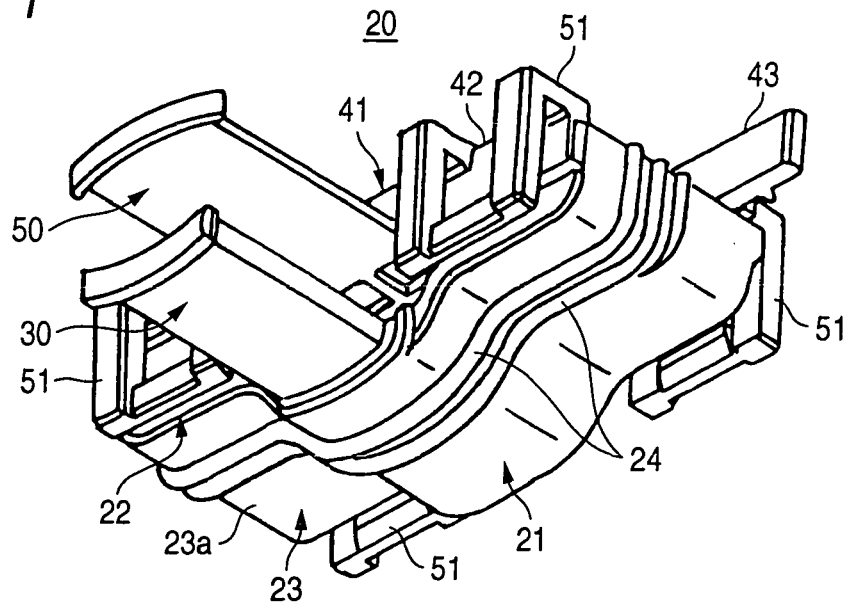
FIG. 1 is a perspective view showing a grommet according to a first embodiment of the invention.
Figure 2:
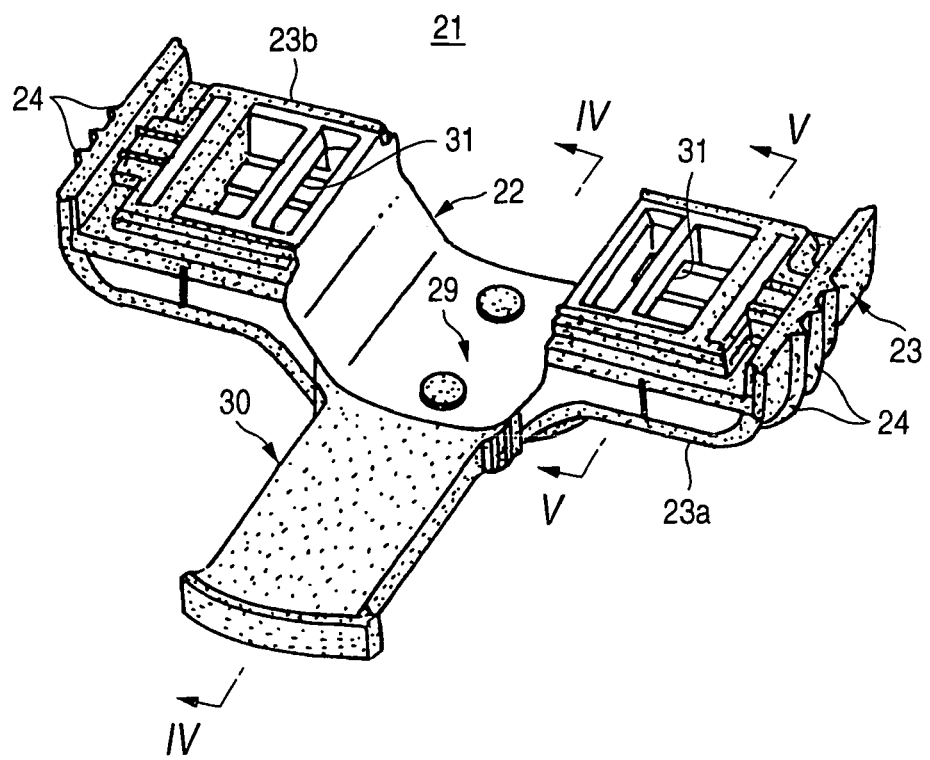
FIG. 2 is a perspective view showing one resin-molded division member shown in FIG. 1.
Figure 3:
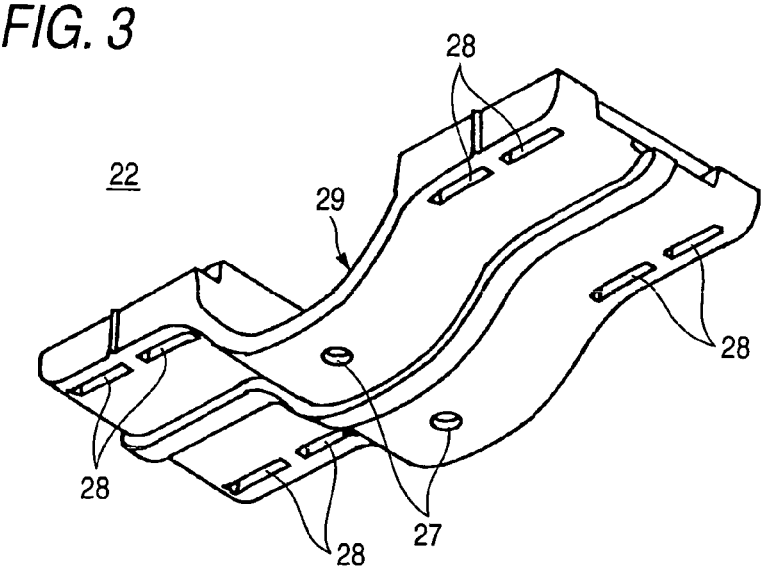
FIG. 3 is a perspective view showing a division member body of the resin-molded division member of FIG. 2.
Figure 4:
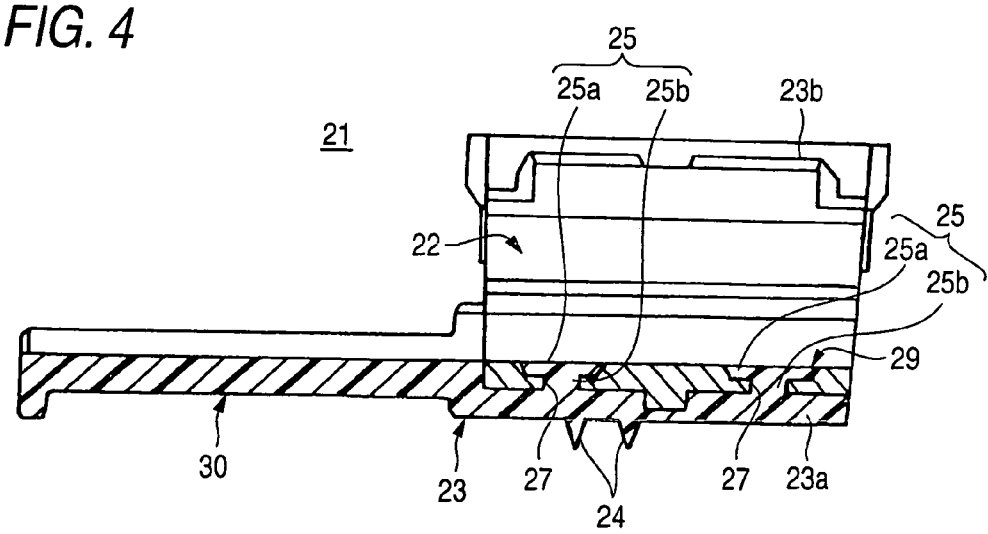
FIG. 4 is a cross-sectional view taken along the line IV—IV of FIG. 2.
Figure 5:
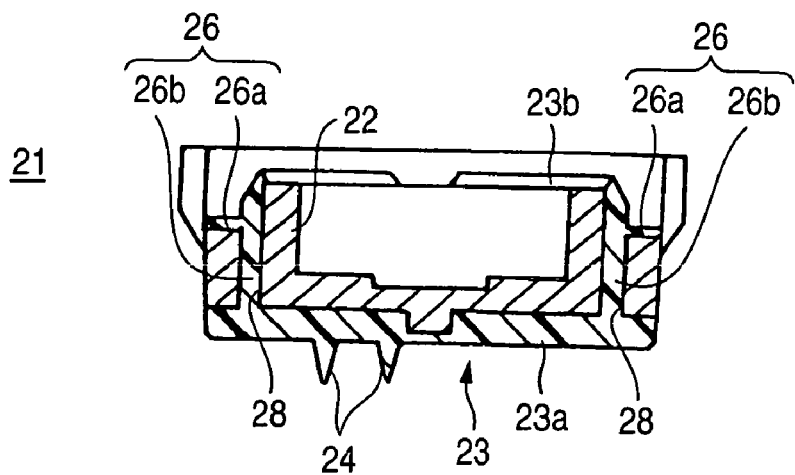
FIG. 5 is a cross-sectional view taken along the line V—V of FIG. 2.
Figure 6:
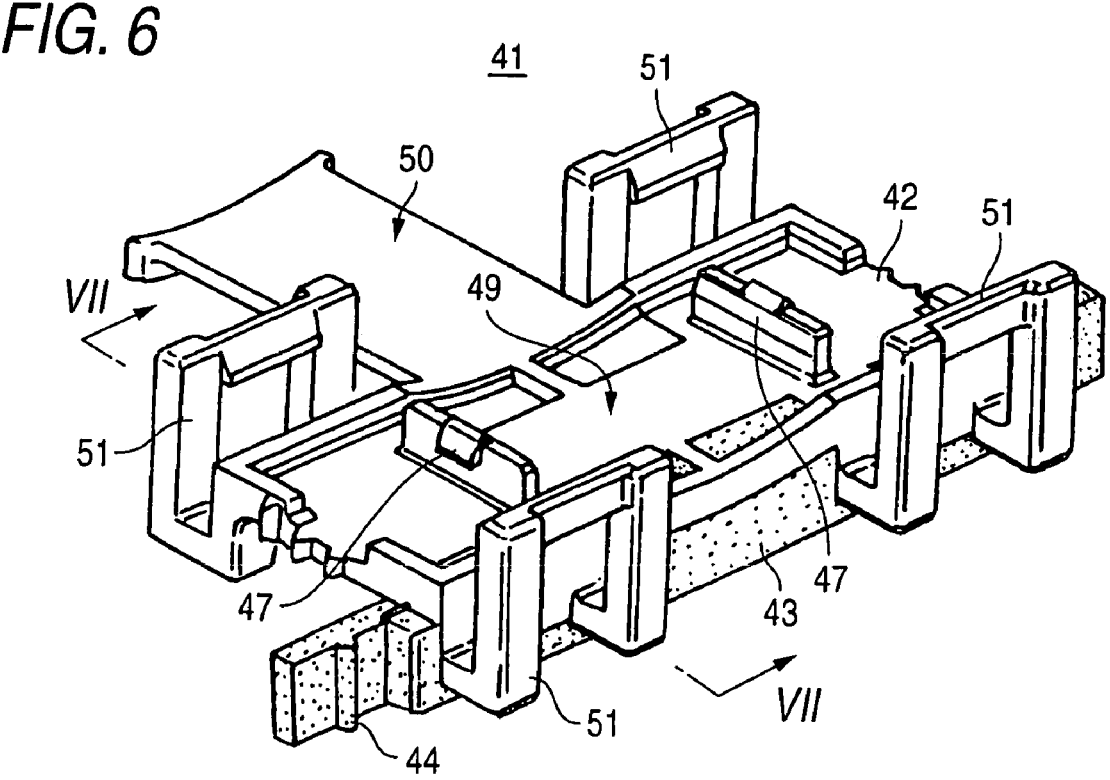
FIG. 6 is a perspective view showing the other resin-molded division member shown in FIG. 1.
Figure 7:
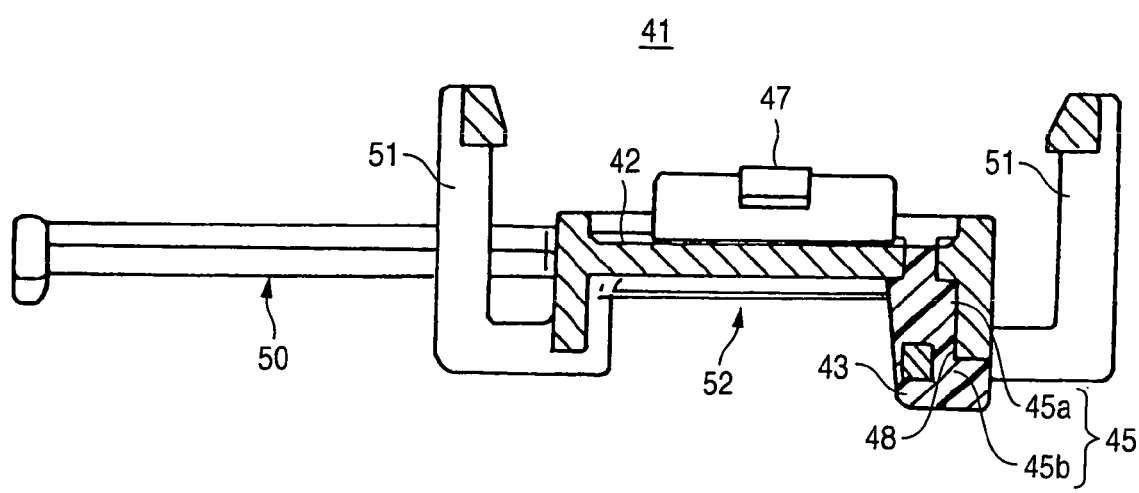
FIG. 7 is a cross-sectional view taken along the line VII—VII of FIG. 6.

FIG. 1 is a perspective view showing the whole of the first embodiment of the grommet of the invention, FIG. 2 is a perspective view showing the whole of one resin-molded division member shown in FIG. 1, FIG. 3 is a perspective view showing the whole of a division member body of the resin-molded division member of FIG. 2, FIG. 4 is a cross-sectional view taken along the line IV—IV of FIG. 2, FIG. 5 is a cross-sectional view taken along the line V—V of FIG. 2, FIG. 6 is a perspective view showing the whole of the other resin-molded division member shown in FIG. 1, and FIG. 7 is a cross-sectional view taken along the line VII—VII of FIG. 6.

Figure 8:
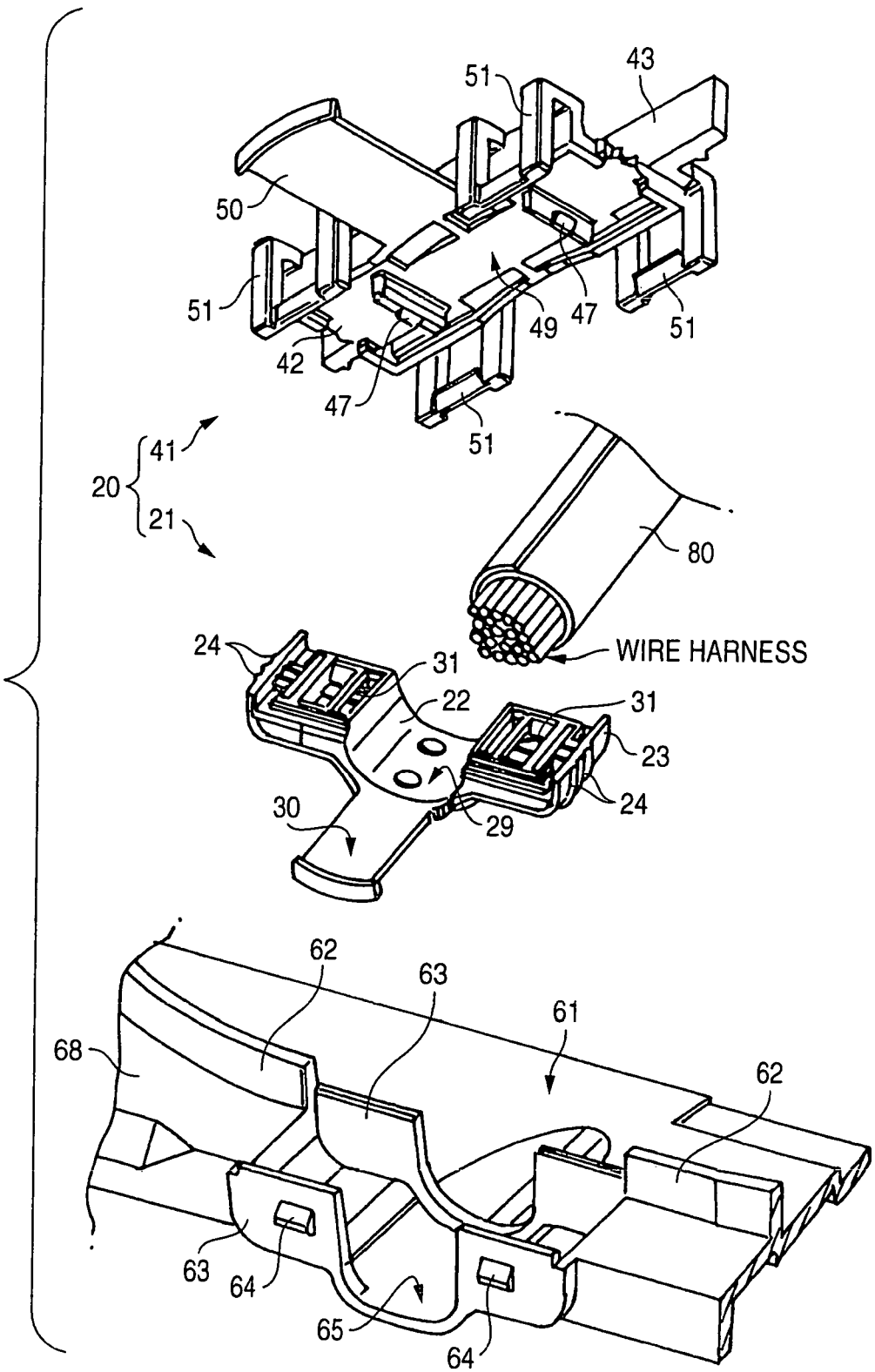
FIG. 8 is an exploded, perspective view explanatory of a procedure of mounting the grommet of FIG. 1 on a waterproof box.

As shown in FIG. 1, the first embodiment of the grommet 20 of the invention is a two-piece grommet, and includes the first and second division members (the pair of resin-molded division members) 21 and 41, and the first and second division members are fastened together, with a wire harness W/H held therebetween, so that the wire harness (elongated member) W/H can pass through an opening portion 65 formed in a waterproof box 60 (described later) (see FIGS. 8 to 10).

As shown in FIGS. 2 and 3, the first division member 21 includes the division member body 22 (made of a polyamide resin such as nylon 66) having a gripping concave portion 29 for gripping the wire harness W/H, and an elastic seal member 23 (made of an elastomer) formed integrally on the division member body 22 by insert molding.

The elastic seal member 23 includes a seal portion 23a which are formed integrally on an outer surface of the division member body 22 for abutting against the opening portion 65, and has a plurality of seal lips 24, a seal portion 23b formed integrally on an inner surface of the division member body 22 for abutting against the second division member (to which the first division member is fastened), and a wire harness-holding portion 30 extending outwardly from the gripping concave portion 29.

As shown in FIG. 2, a pair of retaining portions 31 and 31 for retaining engagement respectively with a pair of retaining piece portions 47 and 47 projecting perpendicularly from the second division member 41 (to which the first division member is fastened) are formed at the inner surface of the division member body 22, and these portions 31 and 47 form retaining members for fastening the first and second division members 21 and 41 together.

As shown in FIG. 3, a plurality of through holes 27 and 28 are suitably formed through the division member body 22 in a direction of its thickness.

Therefore, when the elastic seal member 23 is insert molded on the division member body 22, a molten elastomer flows into the through holes 27 and 28. The molten elastomer, flowed through these through holes 27 and 28, interconnects the inner and outer surfaces of the division member body 22, and is solidified to act, in conjunction with the through-holes 27 and 28, as a joining portion.

As shown in FIG. 4, that portion of the solidified elastomer, passed through each through hole 27, forms a withdrawal prevention portion 25, and this portion 25 has a retaining portion 25a which is spreading inwardly at the inner side (the upper side in FIG. 4) of the division member body 22, and an interconnecting portion 25b.

As shown in FIG. 5, that portion of the solidified elastomer, passed through each through hole 28, forms a withdrawal prevention portion 26, and this portion 26 has a retaining portion 26a which is spreading inwardly at the inner side (the upper side in FIG. 5) of the division member body 22, and an interconnecting portion 26b.

The division member body 22 and the elastic seal member 23 (which is insert molded on the division member body 22) are molded respectively of the polyamide resin and the elastomer which have poor compatibility with each other, and the bonded portions of the two are liable to be separated. Despite this, the division member body 22 and the elastic seal portion 23 are fixed to each other by the withdrawal prevention portions 25 and 26 formed on the elastic seal portion 23, and therefore the elastic seal portion 23 is prevented from separation and displacement.

As shown in FIGS. 6 and 7, the second division member 41 includes a generally-rectangular plate-like division member body 42 (made of a polyamide resin such as nylon 66) having a grip portion 49 for gripping the wire harness W/H, and an elastic seal member 43 (made of an elastomer) formed integrally on the division member body 42 by insert molding.

Figure 9:
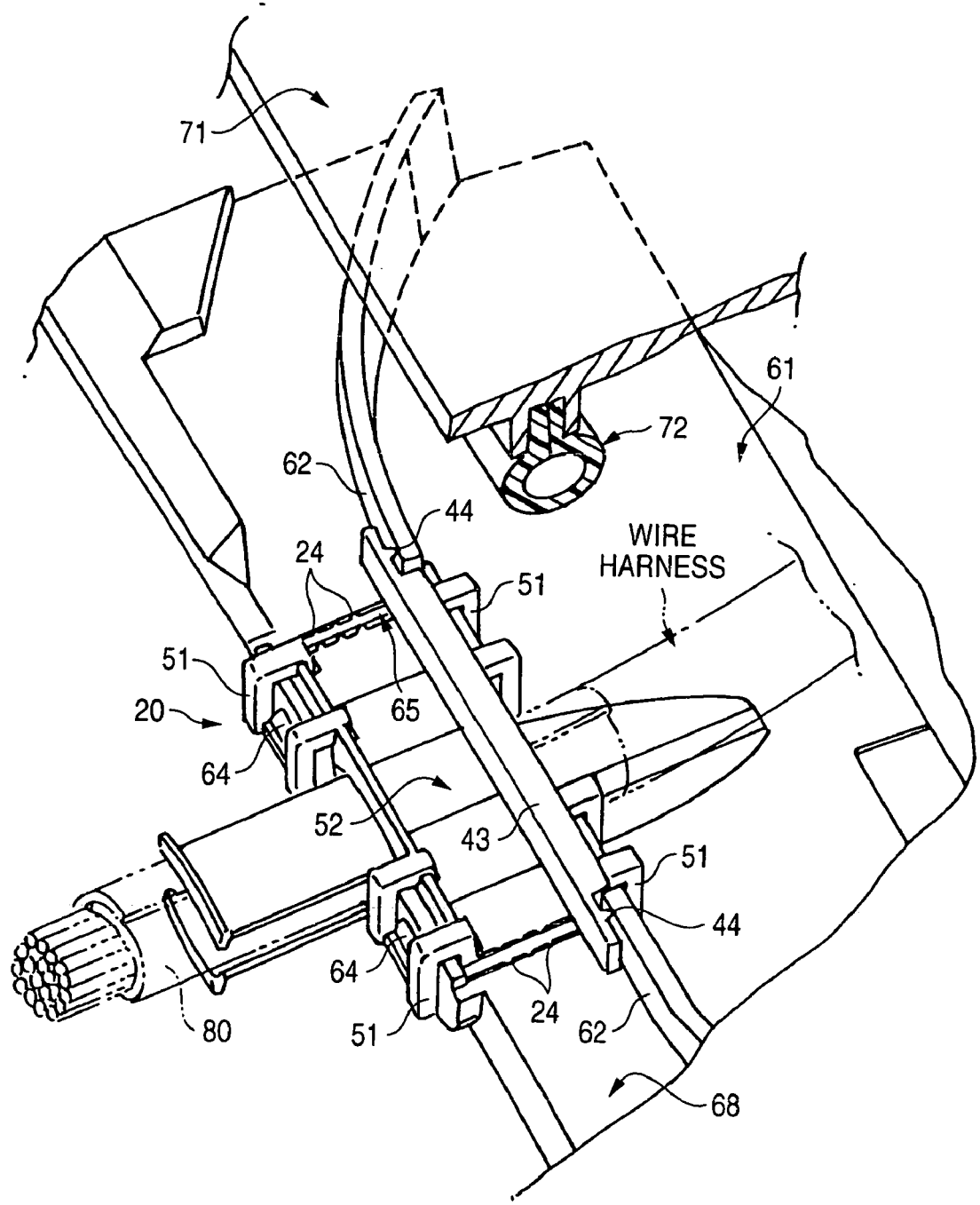
FIG. 9 is a fragmentary, perspective view showing a condition in which the grommet of FIG. 8 is fitted in an opening portion of the waterproof box.

The elastic seal member 43 is formed integrally on the outside of the division member body 42, and has waterproof ribs 44 for abutting against a waterproof wall 62 formed vertically at an edge of an opening in a box body 61 of the waterproof box 60 (see FIG. 9).

An outer surface (a lower surface in FIG. 7) of the division member body 42 serves as a seal member 52 which lies generally flush with a body seal surface 68 (formed at the edge of the opening in the box body 61) in continuous relation thereto. Lock arms 51 for fixing the grommet 20 to the opening portion 65 (notched in the end edge of the opening in the box body 61) are formed respectively at side edges of four corner portions of the division member body 42, and extend perpendicularly therefrom. Namely, the lock arms 51 are retainingly engaged respectively with retaining projections 64 formed on grommet receiving walls 63 of the opening portion 65, thereby fixing the grommet 20 to the opening portion 65, and therefore the lock arms 51 form fixing portions.

As described above, the pair of retaining piece portions 47 are formed on and project perpendicularly respectively from inner surfaces of opposite longitudinal end portions of the division member body 42, with the grip portion 49 disposed therebetween. A wire harness-holding portion 50 is formed on one side edge of the division member body 42, and extends outwardly from the grip portion 49.

As shown in FIG. 7, a plurality of through holes 48 are suitably formed through that portion of the division member body 42 on which the elastic seal portion 43 is insert molded.

Therefore, when the elastic seal member 43 is insert molded on the division member body 42, a molten elastomer flows into the through holes 48. The molten elastomer, flowed through these through holes 48, interconnects the inner and outer surfaces of the division member body 42, and is solidified.

As shown in FIG. 7, that portion of the solidified elastomer, passed through each through hole 48, forms a withdrawal prevention portion 45, and this portion 45 has a retaining portion 45a which is spreading inwardly at the inner side (the upper side in FIG. 7) of the division member body 42, and an interconnecting portion 45b.

The division member body 42 and the elastic seal member 43 (which is insert molded on the division member body 42) are molded respectively of the polyamide resin and the elastomer which have poor compatibility with each other, and the bonded portions of the two are liable to be separated. Despite this, the division member body 42 and the elastic seal portion 43 are fixed to each other by the withdrawal prevention portions 45 formed on the elastic seal portion 43, and therefore the elastic seal portion 43 is prevented from separation and displacement.

Next, a procedure of mounting the grommet 20 on the waterproof box 60 will be described with reference to FIGS. 8 to 10.

First, a water-stop agent is coated on a predetermined portion of the wire harness W/H, and an adhesive sheet 80 is wound on wires of the wire harness to bundle the same, thereby forming a water-stop portion which is to be gripped by the grommet 20.

Then, the pair of retaining piece portions 47 and 47 are retainingly engaged with the pair of retaining portions 31 and 31, respectively, in such a manner that the water-stop portion of the wire harness W/H is held between the gripping concave portion 29 and the grip portion 49, and by doing so, the first division member 21 and the second division member 41 are combined together.

The contacted portions of the first and second division members 21 and 41 are sealed by the seal portion 23b formed integrally on the inner surface of the division member body 22.

That portion of the wire harness W/H, disposed adjacent to the first and second division members 21 and 41 (which jointly grip the wire harness W/H), is held between the wire harness-holding portions 30 and 50 extending respectively from the first and second division members 21 and 41, and a tape is wound on the wire-holding portions 30 and 50, thereby fixing this portion of the wire harness to the wire-holding portions 30 and 50.

Then, the grommet 20, gripping the wire harness W/H, is fitted into the opening portion 65 in the box body 61, and the lock arms 51 of the second division member 41 are retainingly engaged respectively with the retaining projections 64, thereby fixing the grommet to the opening portion 65, as shown in FIG. 9.

At this time, the seal portion 23a, having the seal lips 24, forms a seal between the contacted portions of the first division member 21 and opening portion 65. The elastic seal portion 43 of the second division member 41 is held against the waterproof wall 62, formed vertically at the edge of the opening in the box body 61, to form a seal therebetween.

In the grommet 20 fixed to the opening portion 65, the seal surface 52 of the second division member 41 lies generally flush with the body seal surface 68 of the box body 61 in continuous relation thereto.

Figure 10:
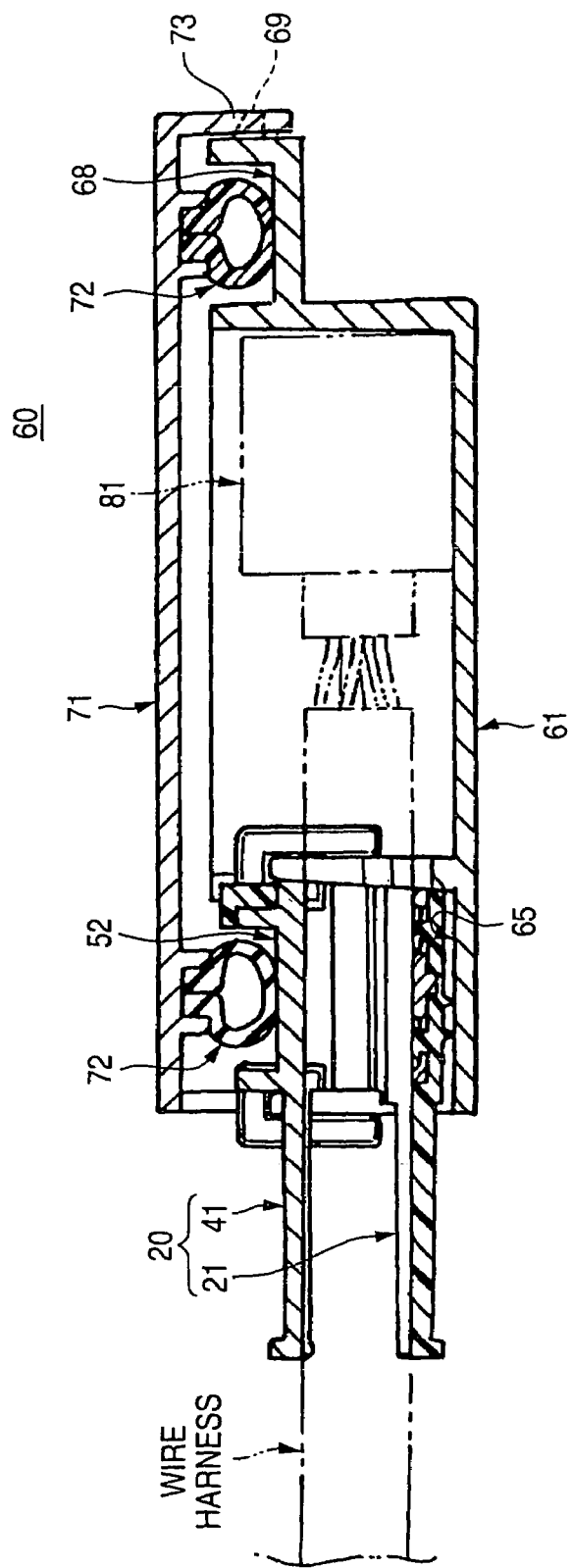
FIG. 10 is a vertical cross-sectional view of the waterproof box having the opening portion in which the grommet of FIG. 8 is mounted.

Then, when a lid 71 is attached to the box body 61 to close an upper opening of this box body 61, a weather strip 72, mounted on a peripheral edge portion of the lid 71, is held in intimate contact with the seal surface 52 and the body seal surface 68, as shown in FIG. 10.

In this condition, a plurality of lock piece portions 73, formed on a peripheral wall of the lid 71, are retaininly engaged respectively with retaining projections 69 on the box body 61 so that the lid 71 is fixed to the box body 61.

Namely, in the grommet 20 used for passing the wire harness W/H through the opening portion 65 of the waterproof box 60, the seal portion 23a of the elastic seal portion 23, formed integrally on the outer surface of the division member body 22, abuts against the opening portion 65 to form a seal between the grommet and the opening portion 65, and the gripping concave portion 29 and the grip portion 49 grip the water-stop portion of the wire harness W/H to thereby form a seal between the grommet and the wire harness W/H. A soft seal member, made of a foamed material, may be interposed between the grommet and the wire harness W/H.

Therefore, an electrical part 81, which is received within the waterproof box 60, and is connected to the wire harness W/H, is positively waterproofed by the waterproof box 60.

Figure 11:
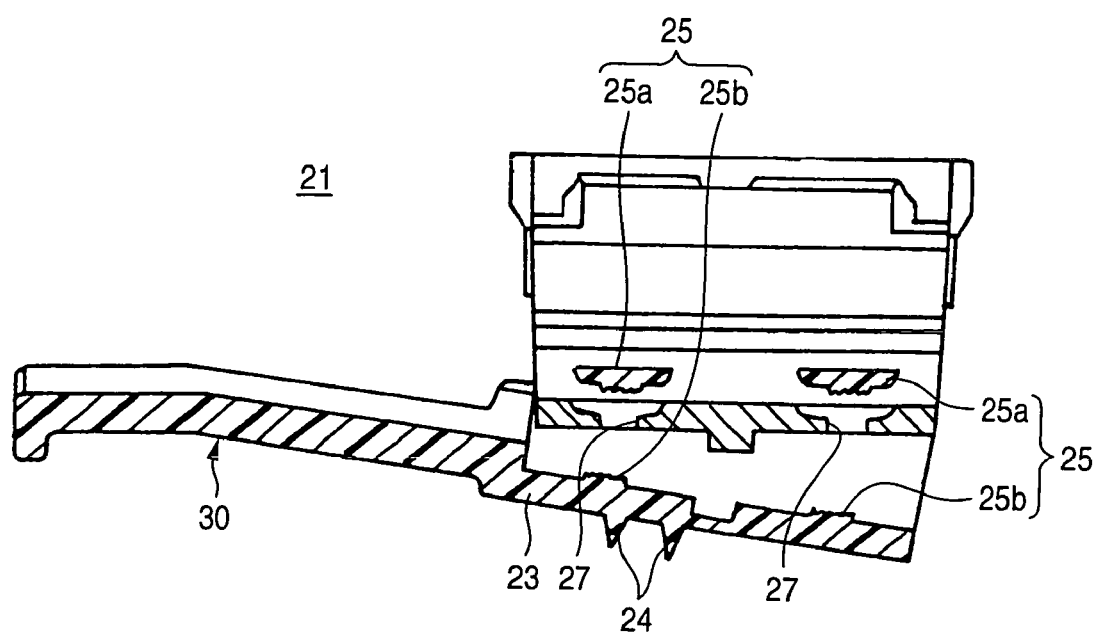
FIG. 11 is a cross-sectional view showing a condition in which an elastic seal member is removed from the one resin-molded division member of FIG. 4.

When the used grommet 20 of this embodiment is to discarded, and when the division member body 22 and the elastic seal portion 23 of the first division member 21 (or the division member body 42 and the elastic seal portion 43 of the second division member 41) are to be assorted in a recycling process, the interconnecting portions 25b of the withdrawal prevention portions 25, fixing the elastic seal portion 23 to the division member body 22 (in the case of the first division member 21), are broken as shown in FIG. 11, and by doing so, the elastic seal member 23 can be easily removed from the division member body 22.

Namely, the division member body 22 and the elastic seal member 23 are molded respectively of the polyamide resin and the elastomer which have poor compatibility with each other, and therefore the bonded portions of the two can be easily separated, so that the efficiency of the assorting operation is enhanced.

With respect to the second division member 41, similarly, the interconnecting portions 45b of the withdrawal prevention portions 45, fixing the elastic seal portion 43 to the division member body 42, are broken, and by doing so, the elastic seal member 43 can be easily separated from the division member body 42.

The pair of resin-molded division members, elastic seal members and withdrawal prevention portions, etc., of the grommet of the first embodiment are not limited to the construction of this embodiment, but each can take any other suitable form.

For example, although the grommet 20 of the first embodiment is adapted to be mounted in the opening portion 65 of the waterproof box 60 serving as the mounting member, the grommet can be mounted on other mounting member such as a car body panel. In the above embodiment, although the wire harness W/H is used as the elongated member, any other suitable member such as a tube and a cable can be used.

In the grommet 20 of the first embodiment, the division member bodies 22 and 42 of the first and second division members (the pair of resin-molded division members) 21 and 41 are both made of the polyamide resin. However, for example, when the elastic seal member made of the elastomer is insert molded on one of the two resin-molded members, it is not always necessary that the other resin-molded member should be made of the polyamide resin.

Figure 12:
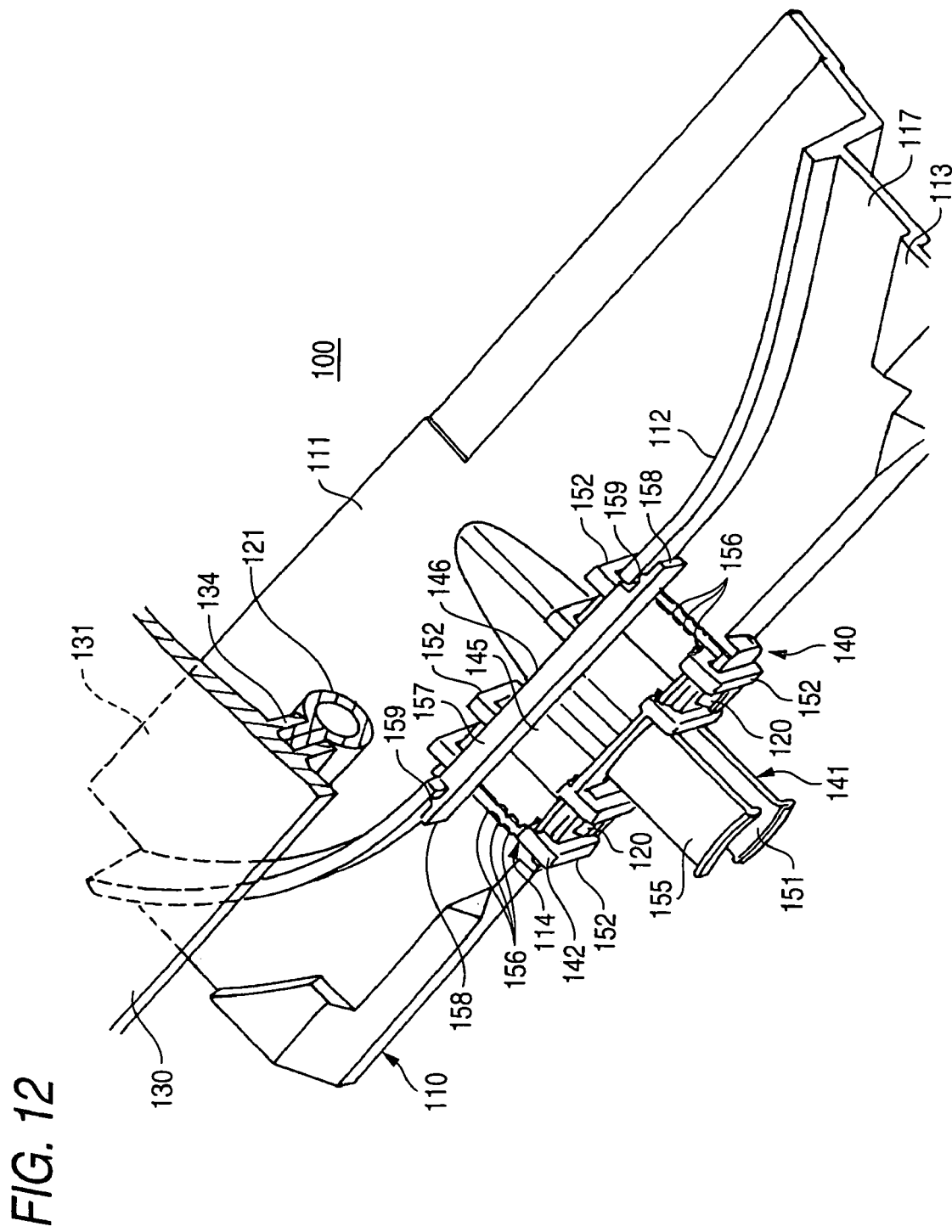
FIG. 12 is a perspective view of a second embodiment of a grommet of the invention, showing its appearance.
Figure 13:
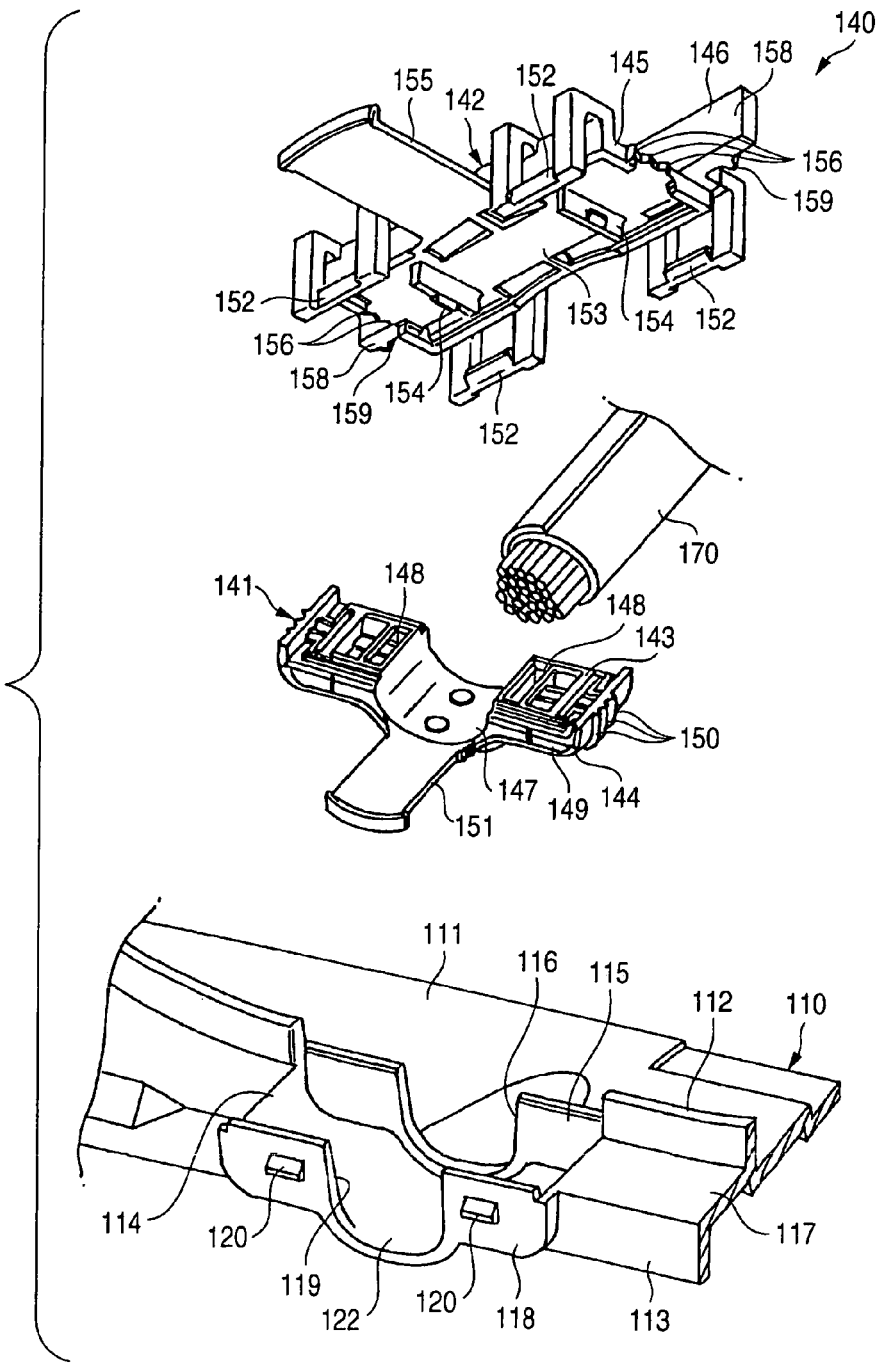
FIG. 13 is a perspective view explanatory of the mounting relation between various parts of the grommet of FIG. 12.
Figure 14:
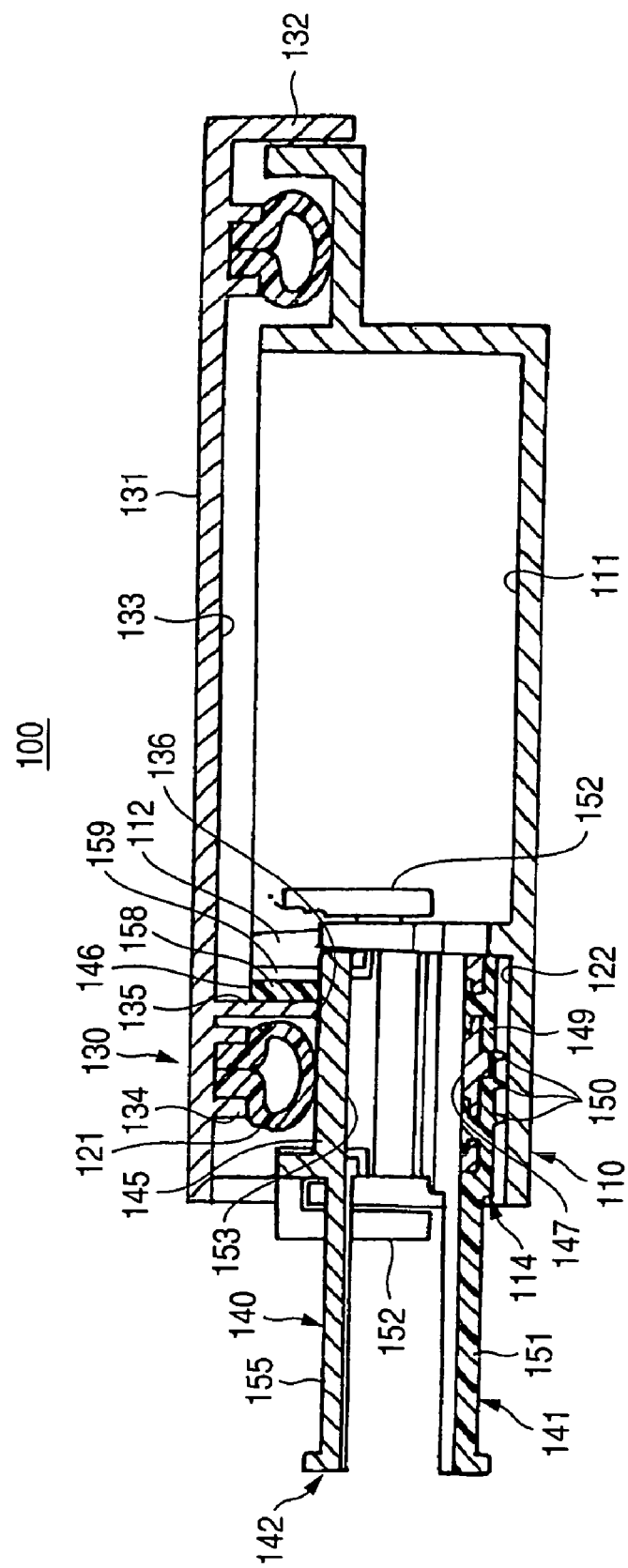
FIG. 14 is a vertical cross-sectional view of a waterproof box shown in FIG. 12.

Next, a second embodiment of a grommet of the invention will be described in detail with reference to FIGS. 12 to 17. FIG. 12 is a perspective view of the second embodiment of the grommet of the invention, showing its appearance, FIG. 13 is a perspective view explanatory of the mounting relation between various parts of the grommet of the second embodiment shown in FIG. 12, FIG. 14 is a vertical cross-sectional view of a waterproof box shown in FIG. 12, FIG. 15 is a perspective view of a first division member of the grommet shown in FIG. 12, FIG. 16 is a perspective view of a second division member of the grommet shown in FIG. 12, and FIG. 17 is a perspective view of the second division member of FIG. 16 as seen from a lower side thereof.

Figure 15:
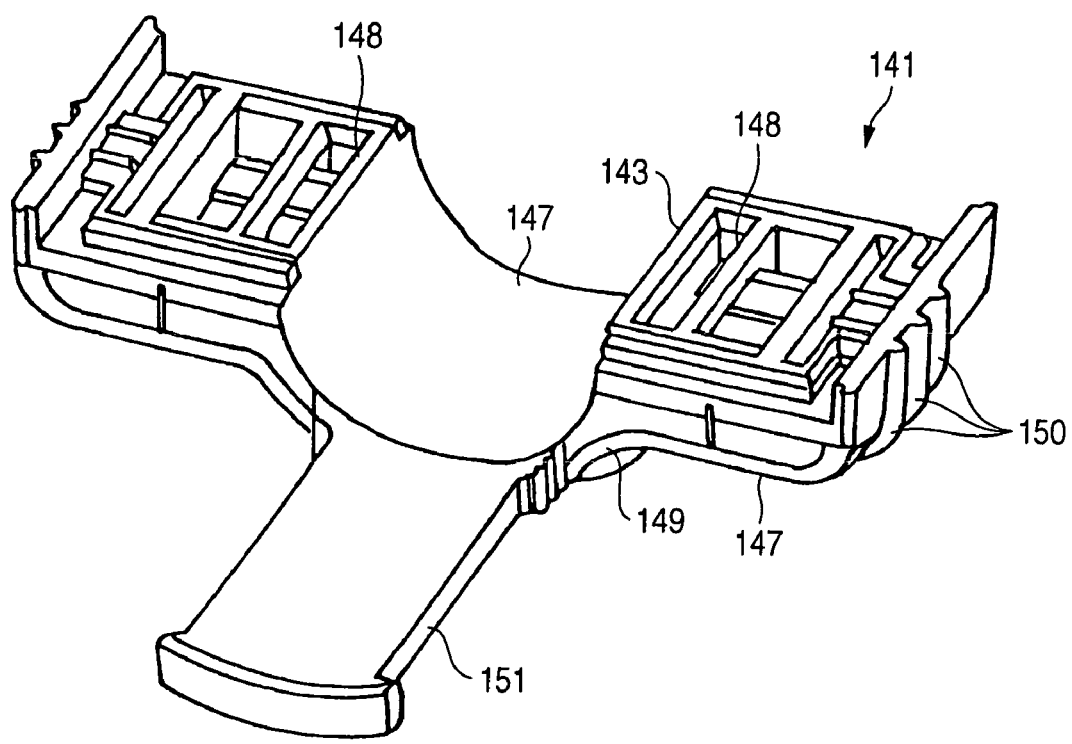
FIG. 15 is a perspective view of a first division member of the grommet shown in FIG. 12.
Figure 16:
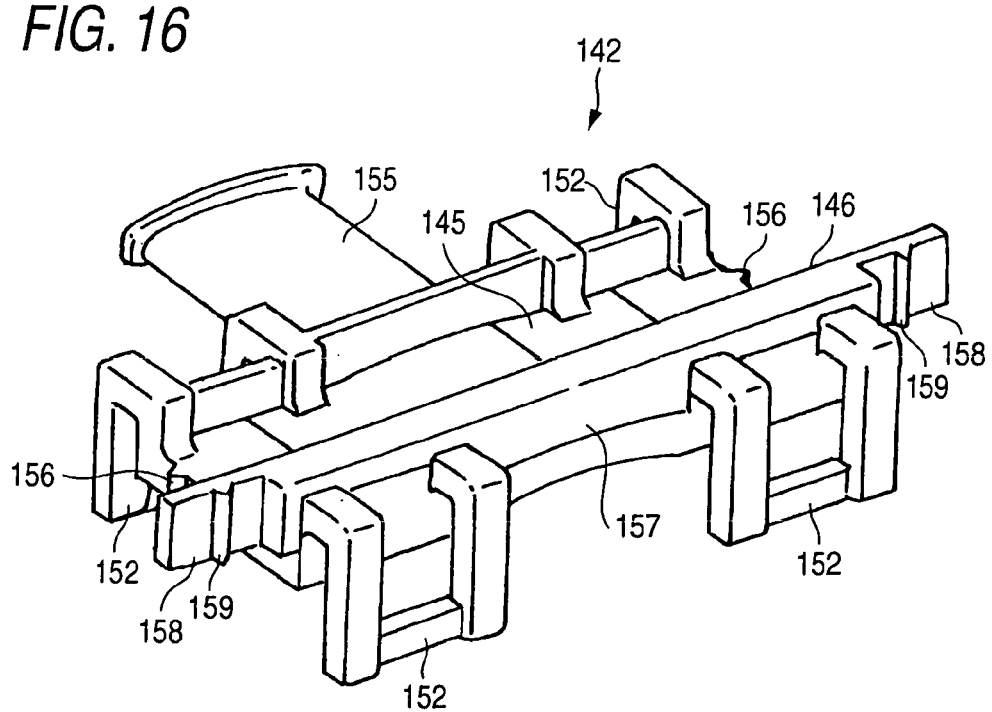
FIG. 16 is a perspective view of a second division member of the grommet shown in FIG. 12.
Figure 17:
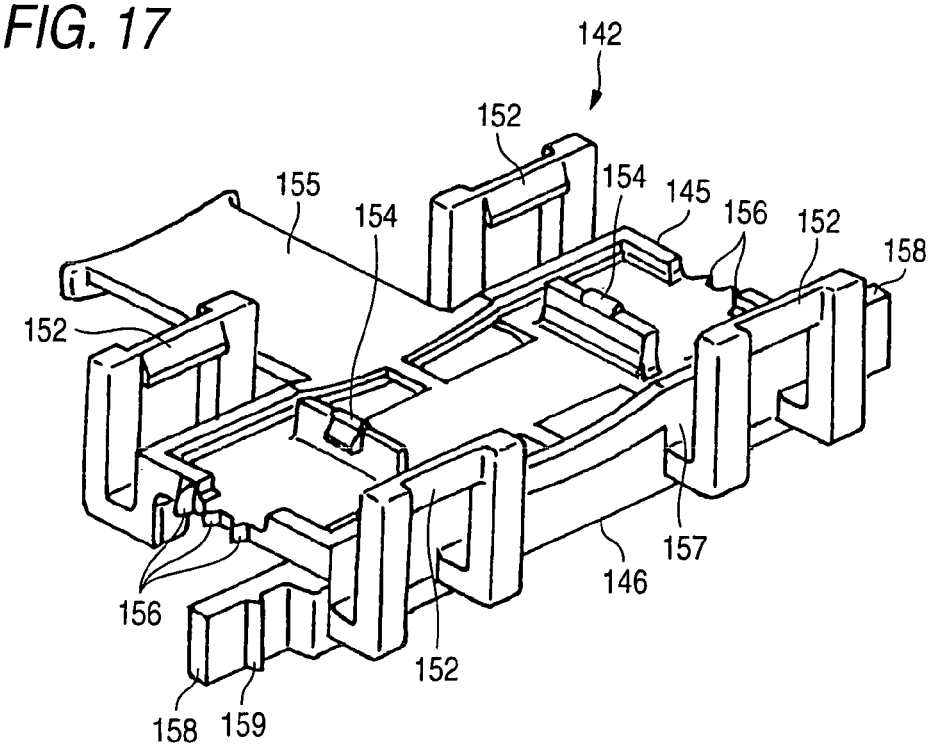
FIG. 17 is a perspective view of the second division member of FIG. 16 as seen from a lower side thereof.

The grommet 140 according to the second embodiment of the invention is of a two-piece construction, and includes the first division member 141 (shown in FIG. 15), and the second division member 142 shown in FIGS. 16 and 17.

As shown in FIG. 15, the first division member 141 includes a first division member body 143, and a first seal portion 144. The second division member 142 includes a second division member body 145, and a second seal portion 146.

The first division member body 143 is formed into a generally I-shaped plate-like configuration as a whole. A harness support portion 147 is formed in a central portion of an upper surface of the first division member body 143, and this harness support portion 147 is curved into a generally semi-circular shape corresponding to a shape of a grommet abutment surface 122.

A pair of engagement holes 148 of a rectangular shape are formed in the upper surface of the first division member 143, and are disposed on opposite sides of the harness support portion 147, respectively.

The first seal portion 144 is formed into a generally T-shaped plate-like configuration as a whole. A head portion of the T-shaped body of the first seal portion 144 serves as a body connection portion 149, and therefore this portion is fittingly mounted on the lower surface of the first division member body 143. Three waterproof ribs 150 are formed on an outer surface of this body connection portion 149.

The first seal portion 144 has a harness fastening portion 151 extending from its central portion corresponding to the harness support portion 147 of the first division member body 143.

As shown in FIGS. 16 and 17, the second division member body 145 is formed into a generally T-shaped plate-like configuration as a whole. Grommet-side fixing portions 152 of a square shape are formed on and project downwardly respectively from four corner portions of the second division member body 145. The grommet-side fixing portions 152 are fitted respectively on box body-side fixing portions 120 formed on a grommet mounting portion 114 of the box body 110, thereby fixing the grommet 140 to the box body 110.

A pair of retaining projections 154, corresponding respectively to the engagement holes 148 in the first division member body 143, are formed on and project from the lower surface of the second division member body 145. When the second division member 142 is combined with the first division member 141, the retaining projections 154 are engaged respectively in the engagement holes 148 in the first division member body 143, thereby fastening the two division members 142 and 141 together.

A harness fastening portion 155, corresponding to the harness fastening portion 151 of the first seal portion 144, is formed on and extends from the second division member body 145. Three rib-like projections 156, corresponding to the waterproof ribs 150 of the first seal portion 144, are formed on each of opposite end edges of the second division member body 145.

The second seal portion 146 has a base portion 157 of a generally I-shaped plate-like configuration, and thin plate portions 158, smaller in thickness than the base portion 157, are formed at opposite ends of the base portion 157. A vertically-extending waterproof rib 159 is formed on a central portion of each thin plate portion 158, and extends in a direction of mounting of the grommet 140.

The second seal portion 146 is fixed to that portion (front portion in FIG. 16) of the upper surface of the second division member body 145 which is to be disposed immediately adjacent to a peripheral wall 112 of the box body 110. Therefore, when the grommet 140 is fixed to the box body 110, with the grommet-side fixing portions 152 of the second division member 142 fitted respectively in the box body-side fixing portions 120 on the grommet mounting portions 114 of the box body 110, the waterproof ribs 159 abut against the peripheral wall 112 of the box body 110.

As a result, the thin plate portions 158 are elastically deformed in a direction away from the peripheral wall 112, so that the waterproof ribs 159 are not excessively pressed against the peripheral wall 112, and therefore the mounting of the grommet 140 can be carried out smoothly.

As a lid 130 is fitted on the box body 110, a tapering surface 136 of each of pressing projections 135, formed on the lid 130, impinges on the corresponding thin plate portion 158 of the second seal portion 146, so that the pressing projection 135, while prevented from impinging directly on the thin plate portion 158, is inserted to be disposed at the rear side of the thin plate portion 158, and presses the corresponding waterproof rib 159 against the peripheral wall 112 through the thin plate portion 158, thereby forming a waterproof seal at the peripheral wall 112 of the grommet mounting portion 114.

As shown in FIGS. 12 to 14, the waterproof box 101 on which the grommet 140 of this embodiment is mounted comprises the box body 110, and the lid 130. A partition plate 115 and a notch opening portion 116 (which form part of the grommet mounting portion 114) are formed at part of the peripheral wall 112 of the box body 110. The notch opening portion 116 of a generally semi-circular shape is formed or notched in a central portion of the partition plate 115.

An outside plate 113 is provided outside of the outer periphery of the peripheral wall 112, and is continuous therewith via an elastically-pressing portion 117. A partition plate 118 and a notch opening portion 119 (which form part of the grommet mounting portion 114) are formed at part of the outside plate 113. The partition plate 118 is disposed such that this partition plate 118 and the partition plate 115 of the peripheral wall 112 form a mating pair. The notch opening portion 119 and the notch opening portion in the peripheral wall 112 form a mating pair. The notch opening portion 116 of a generally semi-circular shape is formed or notched in a central portion of the partition plate 118. The pair of box body-side fixing portions 120 are formed on and project from the partition plates 118, and are disposed on the opposite sides of the notch opening portion 119, respectively. An elastic seal member 121 of an endless construction, fitted in an elastic seal-fitting portion 34, is pressed against the elastically-pressing portion 117.

The partition plate 115 of the peripheral wall 112 and the partition plate 118 of the outside plate 113 are arranged to form the mating pair, and also the notch opening portion 116 of the peripheral wall 112 and the notch opening portion 119 of the outside plate 113 are arranged to form the mating pair. With this arrangement, the grommet abutment surface 122, forming part of the grommet mounting portion 114, is formed between the two partition plates 115 and 118. The grommet abutment surface 122 is recessed (that is, made concave) relative to the surface of the elastically-pressing portion 117.

The pair of bar-like pressing projections 135 are formed on that portion of a lower surface 133 of the lid 130, corresponding to the grommet mounting portion 114, and project toward the box body 110. The pressing projections 135 are arranged to correspond respectively to the waterproof ribs 159 of the second seal portion 146 provided at the second division member 142 of the grommet 140.

The tapering surface 136 is formed on the inner surface of each pressing projection 135 at the distal end thereof, and when the lid 130 is fitted to be on the box body 110, the tapering surface 136 prevents the pressing projection 135 from impinging directly on the upper edge of the second seal portion 146.

Next, a procedure of mounting the grommet 140 of this embodiment on the waterproof box 101 will be described.

First, the first division member 141 is put on a jig. The harness support portion 147 of the first division member body 143 and the body connection portion 149 of the first seal portion 144 are fitted in a notch portion in a central portion of the jig.

Then, a wire harness 170 is put on the harness support portion 147 of the first division member 141. The wire harness 170 has a seal member wound on its outer periphery, this seal member being elastically deformable radially. The wire harness 170 is placed on the harness fastening portion 151 of the first seal portion 144, and further extends therefrom.

Then, the second division member 142 is attached to the first division member 141. At this time, the grommet-side fixing portions 152 of the second division member 142 are not used, and the retaining projections 154 of the second division member 142 are fitted respectively into the engagement holes 148 in the first division member 141. Thus, the second division member 142 is connected to the first division member 141 with a snapping action.

The seal member on the wire harness 170 is held between the harness support portion 147 of the first division member 141 and a harness support portion 153 of the second division member 142. As a result, a waterproof seal is formed at the outer periphery of the wire harness 170. A tape is wound on the harness fastening portion 151 of the first seal portion 144 and the harness fastening portion 155 of the second division member 142 which hold the wire harness 170 therebetween.

Then, the grommet 140, holding the wire harness 170, is mounted on the grommet mounting portion 114 of the box body 110. The grommet 140 is fitted into the notch opening portions 116 and 119 in the grommet mounting portion 114, with the body connection portion 149 of the first seal portion 144 held against the grommet abutment surface 122 of the grommet mounting portion 114. As a result, the grommet-side fixing portions 152 of the second division member 142 are fitted respectively into the box body-side fixing portions 120 of the grommet mounting portion 114 of the box body 110, thereby fixing the grommet 140 to the box body 110. When the grommet 140 is thus fixed to the box body 110, the waterproof ribs 159 of the second seal portion 146 abut against the peripheral wall 112 of the box body 110.

At this time, the lid 130 is not yet fitted on the box body 110, and therefore the thin plate portions 158 of the second seal portion 146 are not pressed by the pressing projections 135 of the lid 130, respectively, and therefore the waterproof ribs 159 merely abut against the peripheral wall 112. As a result, the thin plate portions 158 are elastically deformed in the direction away from the peripheral wall 112, so that the waterproof ribs 159 are not excessively pressed against the peripheral wall 112, and therefore the mounting operation can be carried out smoothly.

Then, the lid 130 is attached to the box body 110. As the lid 130 is fitted on the box body 110, the tapering surface 136 of each of the pressing projections 135, formed on the lid 130, impinges on the upper edge of the corresponding thin plate portion 158 of the second seal portion 146. Therefore, the pressing projection 135, while prevented from impinging directly on the thin plate portion 158, is inserted in to be disposed at the rear side of the thin plate portion 158, and presses the corresponding waterproof rib 159 against the peripheral wall 112 through the thin plate portion 158, thereby forming a waterproof seal at the peripheral wall 112 of the grommet mounting portion 114.

In the grommet 140 of this embodiment, since the waterproof ribs 159 of the second seal portion 146, provided at the second division member 142, abut against the peripheral wall 112 of the box body 110 as described above, the mounting of the grommet 140 on the box body 110 can be effected smoothly.

And besides, the pressing projections 135, formed on the lid 130, respectively press the thin plate portions 148 of the second seal portion 116 toward the peripheral wall 112, so that the waterproof ribs 159 are positively held in sealing engagement with the peripheral wall 112.

The tapering surface 136 is formed on each of the pressing projections 135 of the lid 130 so that each pressing projection 135 will not impinge directly against the corresponding thin plate portion 158 of the second seal portion 146 during the fitting of the lid 130 on the box body 110. Therefore, during the fitting of the lid 130 on the box body 110, each pressing projection 135 will not impinge directly on the thin plate portion 158, and therefore will not crush the thin plate portion 158 and will not deform the waterproof rib 159.

The grommet of the invention is not limited to the above second embodiment, and suitable modifications and improvement can be made.

For example, in the above second embodiment, although one waterproof rib 159, extending in the direction of mounting of the grommet 140, is formed on each of the thin plate portions 158 of the second seal portion 146, two or three waterproof ribs 159 may be provided.

The shape, dimensions, form, number, mounting position, etc., of the wire harness, first division member and second division member, illustrated in the above second embodiment are arbitrary, and are not limited in so far as the present invention can be achieved.

Figure 26:
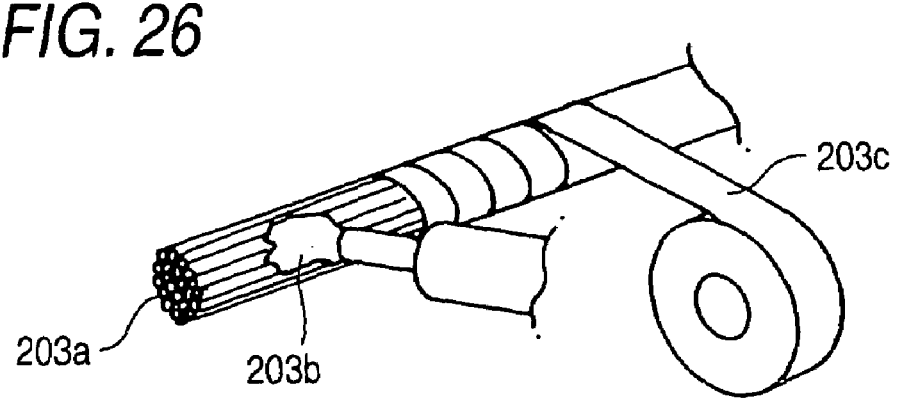
FIG. 26 is a perspective view explanatory of a process of producing a wire harness.

Next, a third embodiment of the invention will be described in detail with reference to the drawings. In the embodiment described below, with respect to a wire harness, already described in FIG. 26, its portions will be designated by identical or corresponding reference numerals, respectively, and description thereof will be simplified or omitted.

Figure 18:
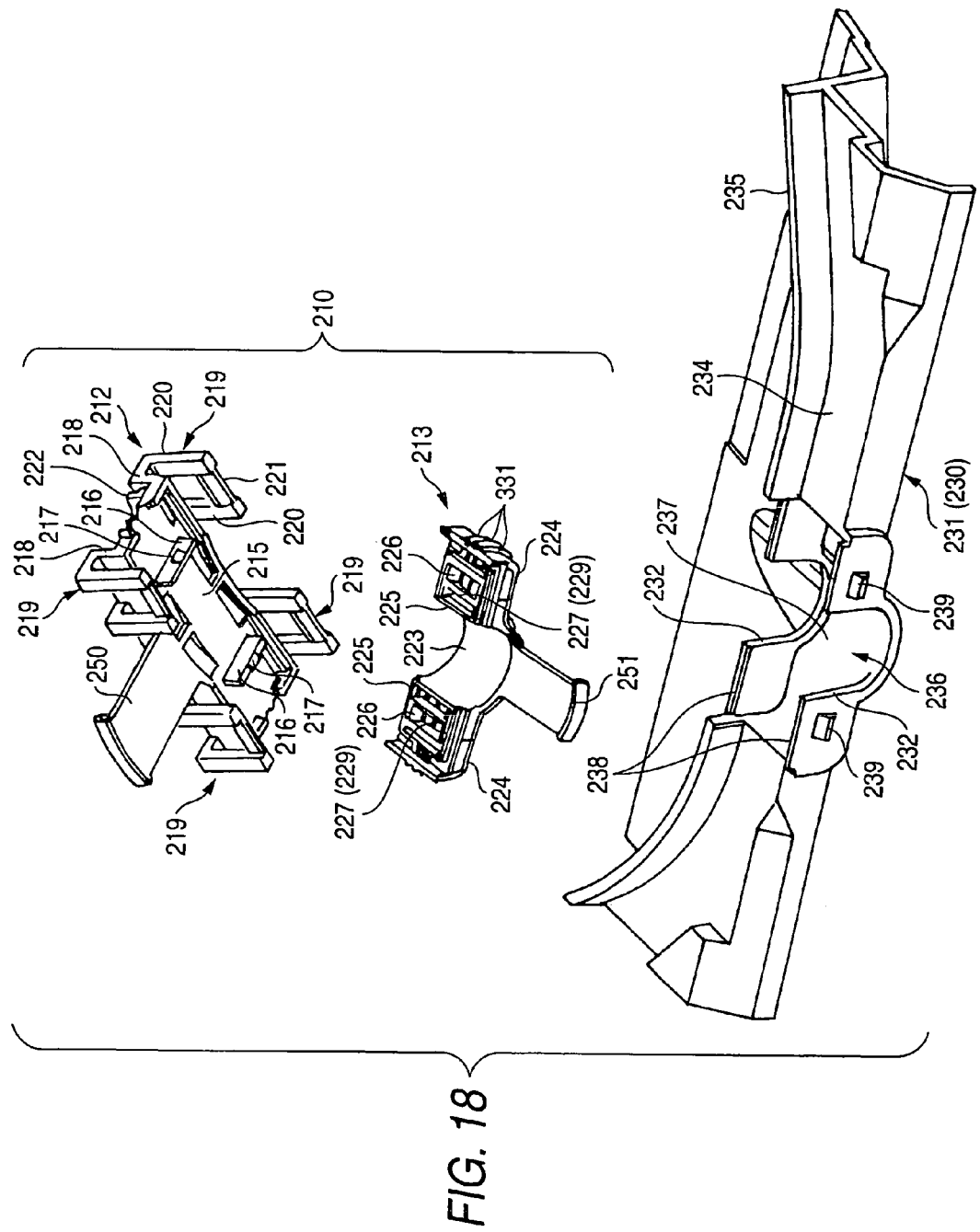
FIG. 18 is an exploded, perspective view showing a division member body and a seal portion of a grommet according to a third embodiment of the invention, and a box body of a waterproof box.
Figure 19A:
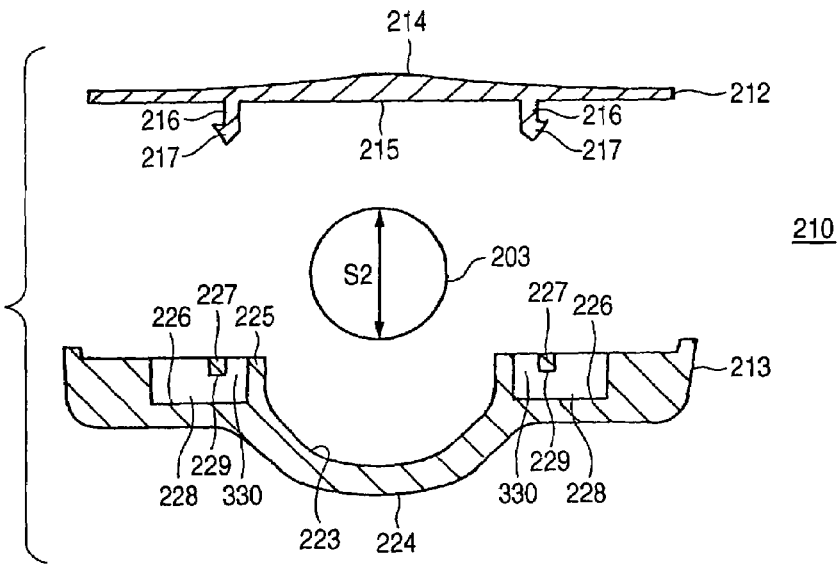
FIGS. 19A and 19B are cross-sectional views of the grommet of the third embodiment.
Figure 19B:
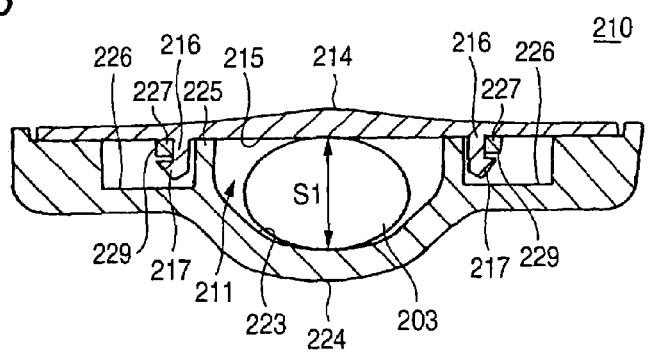

As shown in FIGS. 18 and 19, a grommet 210 of this third embodiment has a tubular grip portion 211 for gripping a water-stop portion of the wire harness 203 in a circumferential direction, and this grommet 210 includes a division member body (first division member) 212, and a seal portion (second division member) 213 which are separated from each other along a plane parallel to an axis of the grip portion 211.

The division member body 212 has a rectangular plate-like shape, and the water-stop portion of the wire harness 203 is adapted to be located at a lengthwise-central portion of the division member body 212 in opposed relation thereto in such a manner that an axis of the water-stop portion extends transversely of the division member body 212.

Retaining ribs 216 are formed on and project downwardly respectively from opposite longitudinal end portions of a flat surface portion 215 of the division member body 212, and hook-like retaining piece portions 217 for retaining engagement respectively with retaining portions 229 (described later) on the seal portion 213 are formed respectively at distal ends of the retaining ribs 216, and are directed away from each other in the longitudinal direction.

Upwardly-projecting ribs 218 are formed respectively at opposite side edges of the division member body 212, and extend in the longitudinal direction of the division member body 212. Lock arms 219 for being fixed respectively to corresponding retaining projections 239 on a box body 231 of a waterproof box 230 (described later) are formed respectively at opposite longitudinal end portions of each of the ribs 218, the number of these lock arms 219 being four in all.

In this embodiment, the retaining portions 229 and the retaining piece portions 217 form retaining members of the invention, and the retaining projections 239 and the lock arms 219 form fixing members of the invention.

Each lock arm 219 includes two arms 220 which first extend laterally outwardly from an outer edge of the corresponding rib 218, and then extend downwardly, and an interconnecting piece portion 221 interconnecting distal ends of the two arms 220. Each interconnecting piece portion 221 is adapted to be retainingly engaged with the corresponding retaining projection 239.

A seal piece 222 (see FIG. 20), made of rubber or the like, is provided at one side edge portion of the outer surface of the division member body 12 on which a bulged portion 214 is formed, and this seal piece 222 extends in the longitudinal direction of the division member body 212.

On the other hand, the seal portion 213 consists of a member which is similar in shape to the division member body 112, that is, has a generally rectangular shape when viewed from the top. The water-stop portion of the wire harness 203 is adapted to be located at a lengthwise-central portion of the seal portion 213 in opposed relation thereto in such a manner that the axis of the water-stop portion extends transversely of the seal portion 213.

A concave portion 223 is formed at the lengthwise-central portion of the seal portion 213, and this concave portion 223 has an inner surface of a generally arcuate shape larger in radius of curvature than the outer diameter of the wire harness 203. Opposite axial ends of this concave portion 223 are open, and a bottom of the concave portion 223 is formed into a curved portion 224A bulging downwardly.

The concave portion 223 of the seal portion 213 and the flat surface portion 215 of the division member body 212 jointly form the tubular grip portion 211 for gripping the water-stop portion of the wire harness 203 in the circumferential direction.

Plate members 224 are formed respectively at opposite ends of the concave portion 223 spaced from each other in the peripheral direction. A recess 226 of a square shape whose four sides are defined by a rib 225 is formed in that portion of each plate member 224 facing the wire harness 203.

A rib 227 extends between opposed inner surfaces of each recess 226 in the widthwise direction of the seal portion 213, and a space 228 is formed between a lower surface of the rib 227 and a bottom surface of the recess 226, and the retaining piece portion 217 of the division member body 212 can be inserted into this space 228, with a gap formed therebetween, and the lower surface of the rib 227 serves as the retaining portion 229 for the retaining piece portion 217. A space 330 is formed between the rib 227 and the rib 225 disposed immediately adjacent to the concave portion 223, and the retaining piece portion 217 can be inserted in this space 330 in an elastically-deformed condition (see FIG. 19A).

A plurality of waterproof ribs 331, made of rubber or the like, are formed on the bottom surface of the seal portion 213, and extend in the longitudinal direction, and are spaced a predetermined distance from one another in the widthwise direction. A waterproof member (not shown), made of a soft material or the like, is provided on an upper surface of each of the plate members 224 formed respectively at the opposite longitudinal ends of the seal portion 213, and this waterproof member forms a seal between the plate member 224 of the seal portion 213 and the division member body 212.

When the water-stop portion of the wire harness 203 is to be gripped by the grip portion 211 of the grommet 210 of the above construction in the circumferential direction, the water-stop portion of the wire harness 203 is located between the flat surface portion 215 of the division member body 212 and the concave portion 223 of the seal portion 213, and then the retaining piece portions 217 of the division member body 212, while elastically deformed, are inserted respectively into the spaces 330 in the seal portion 213, and when the retaining piece portions 217 are further pushed, so that the retaining piece portions 127 reach the spaces 228, respectively, these retaining piece portions 217 are elastically restored to be received in the spaces 228, respectively, and therefore are retainingly engaged with the retaining portions 229, respectively.

As a result, the division member body 212 and the seal portion 213 are combined together, so that the water-stop portion of the wire harness 203 is gripped by the grip portion 211 of the grommet 10 in the circumferential direction. After the division member body 212 and the seal portion 213 are combined together, the seal portion 213 can be disengaged from the division member body 212, for example, by pulling one of them hard relative to the other in the separating direction.

When the retaining piece portions 217 of the division member body 212 are retainingly engaged with the retaining portions 229 of the seal portion 213, respectively, each retaining piece portion 217 is inserted in the corresponding space 228 in the seal portion 213, with a gap formed therebetween. Therefore, the division member body 212 will not be held in intimate contact with the seal portion 213, but can be slightly moved relative to the seal portion 213 in the separating direction by an amount corresponding to this gap.

Therefore, a gap is also formed between the opposed surfaces of each plate member 224 (of the seal portion 213) and division member body 212, and therefore even when the waterproof member of a soft material or the like, interposed between these opposed surfaces, is not provided in a predetermined position or a predetermined shape between the division member body 212 and the seal portion 213, a desired waterproof effect can be achieved by correcting the position and posture of the waterproof member with the hands of the operator in the mutually combined condition of the division member body 212 and seal portion 213 or by self-restoring of this waterproof member into its original shape because of its elastic restoring force.

Figure 20:
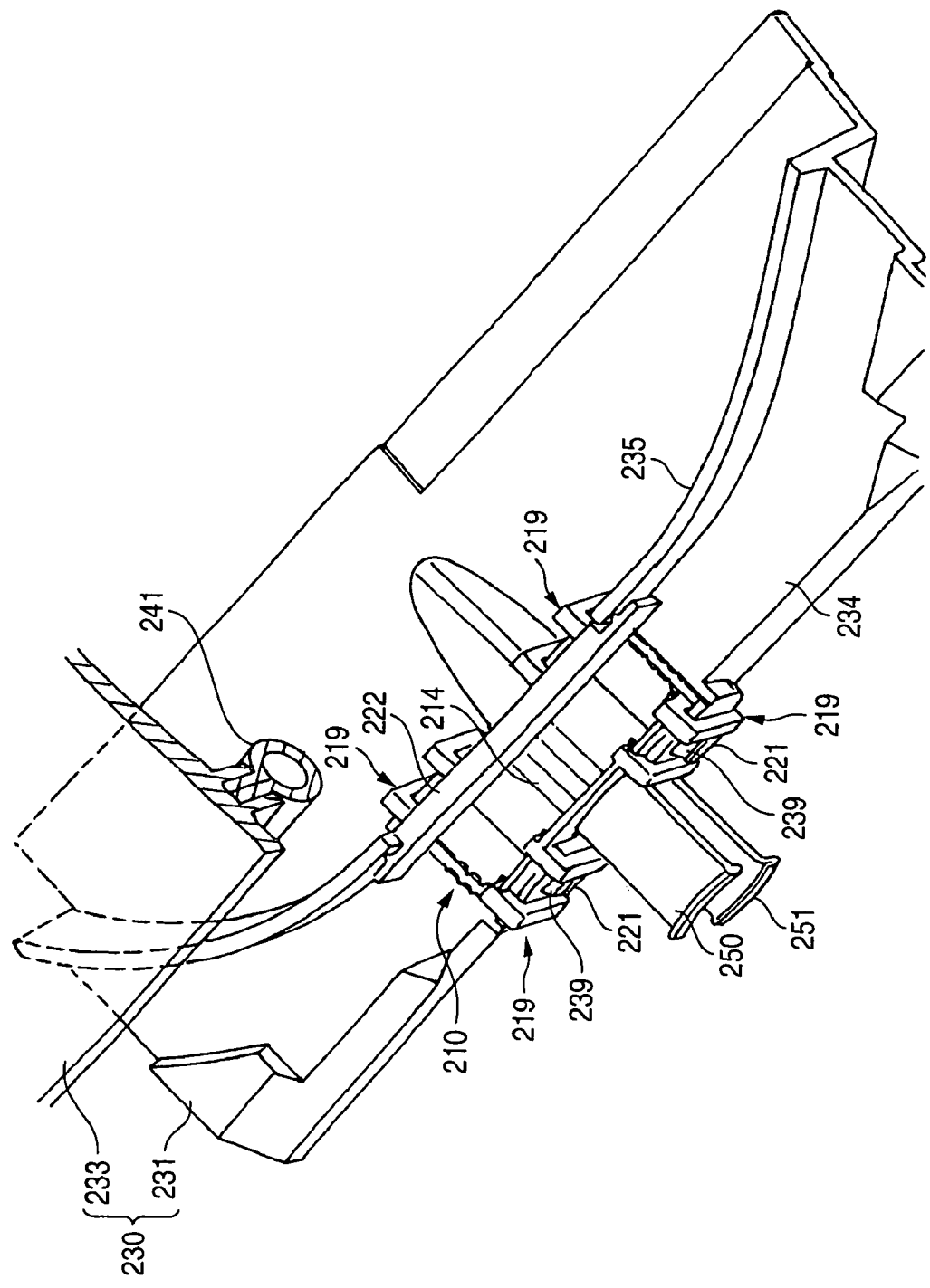
FIG. 20 is an exploded, perspective view of the waterproof box, with the grommet of the third embodiment located in notch portions of the box body.

As shown in FIGS. 18 and 20, the waterproof box 230 includes the box body 231 having notch portions 232, and a lid 233 for covering an upper opening of the box body 231.

An upper surface of one end portion of the box body 231 is formed into a seal surface 234 higher than the other portion, and this seal surface 234 is delimited by a rib 235. A concave portion 236, corresponding in shape to the bottom of the seal portion 213 of the grommet 210, is formed at a generally central portion of the seal surface 234. A deep bottom portion 237 is formed at a central portion of the concave portion 236, and this deep bottom portion 237 corresponds to the curved portion 224A of the seal portion 213, and is deeper than the other portion of the concave portion 236.

Ribs 238 are formed respectively at opposite sides of the concave portion 236 spaced from each other in a widthwise direction (that is, in the widthwise direction of the grommet 210). The notch portion 232, having a shape corresponding to the cross-sectional shape of the concave portion 223 of the seal portion 213, is formed in a central portion of each of the ribs 238. The retaining projections 239 for locking engagement respectively with the corresponding lock arms 219 of the division member body 212 are formed respectively on outer surfaces of those portions of each rib 238 disposed respectively at opposite sides of the corresponding notch portion 232.

Figure 21:
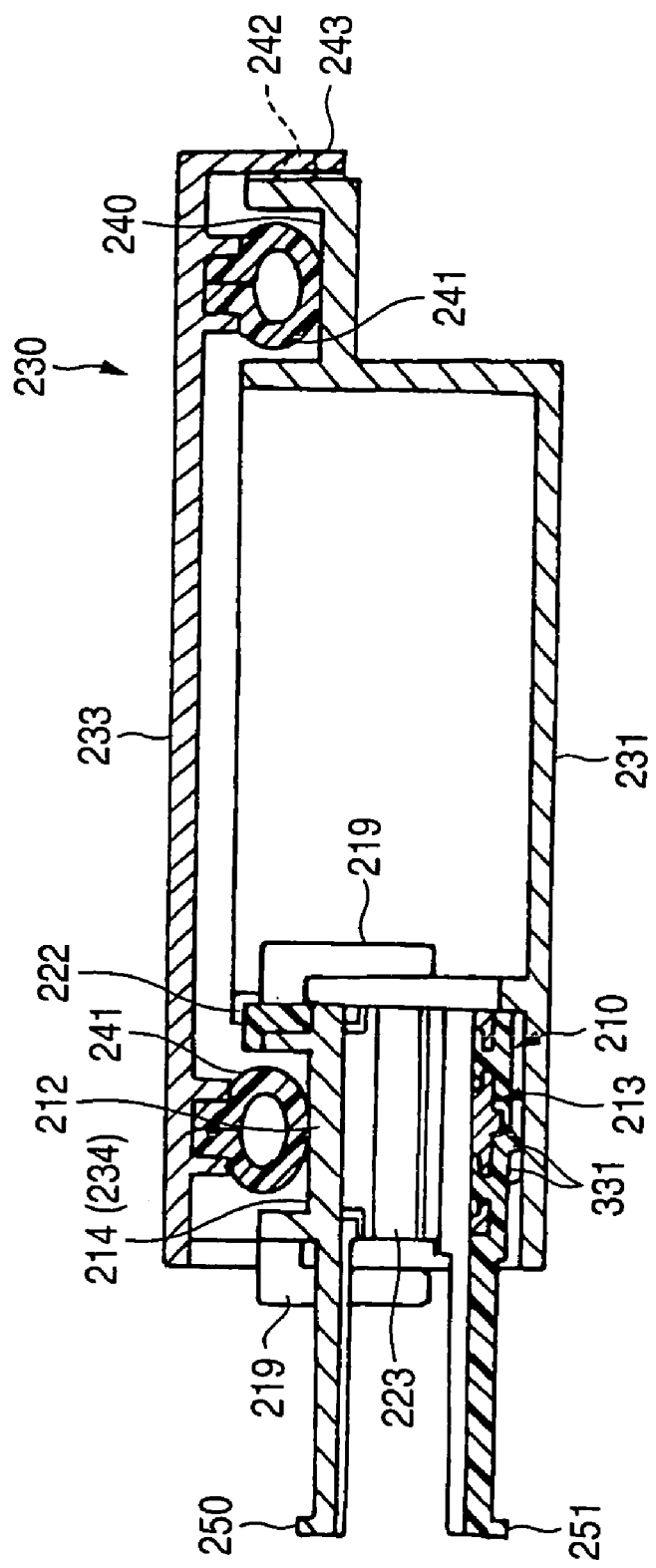
FIG. 21 is a cross-sectional view showing a condition in which the grommet of the third embodiment is fixed to the notch portions of the waterproof box.
Figure 23A:
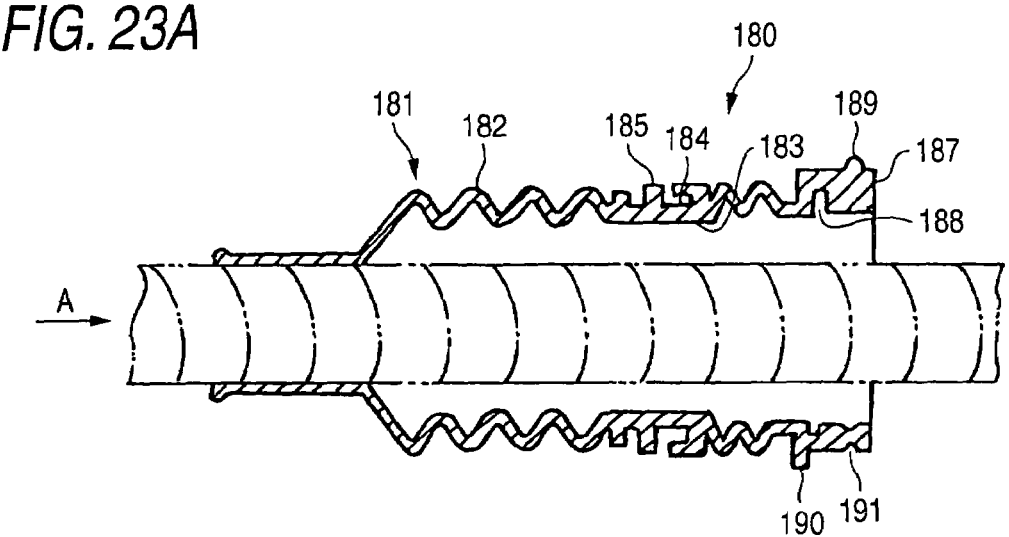
FIGS. 23A and 23B are views explanatory of a related grommet.
Figure 23B:
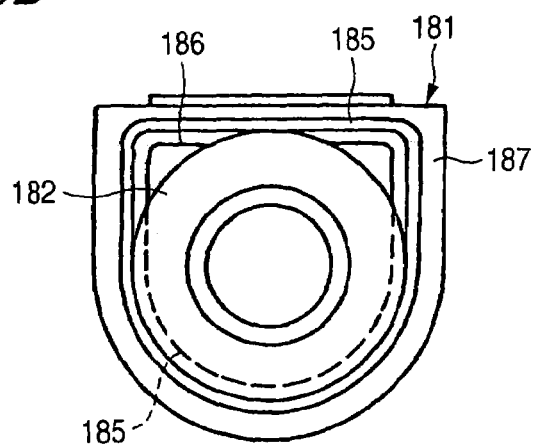
Figure 24A:
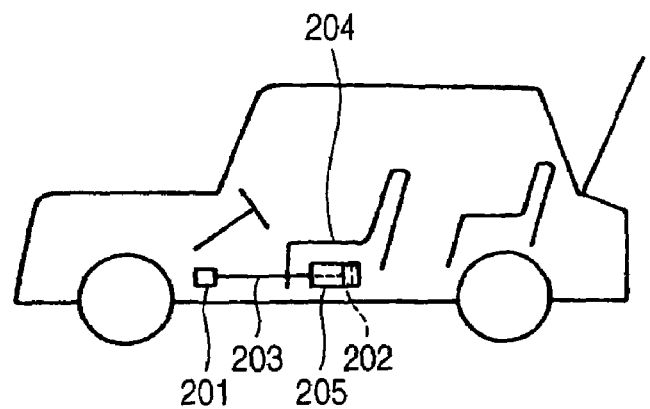
FIG. 24A is view explanatory of a relief apparatus mounted on a vehicle.
Figure 24B:
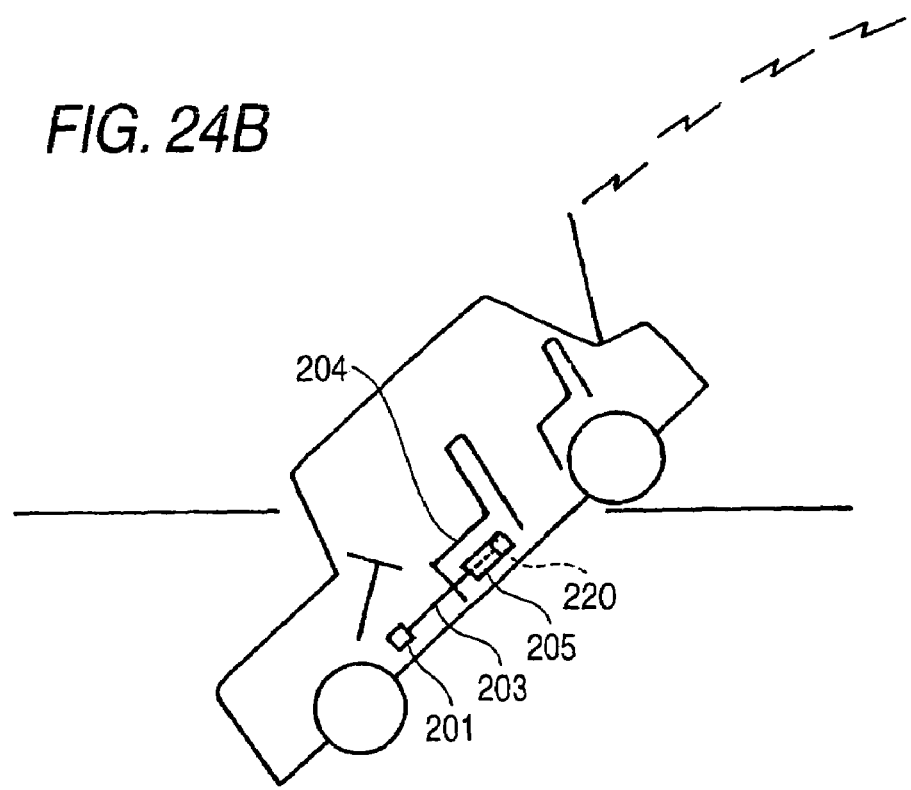
FIG. 24B is a view explanatory of a submerged condition of the vehicle.
Figure 25:
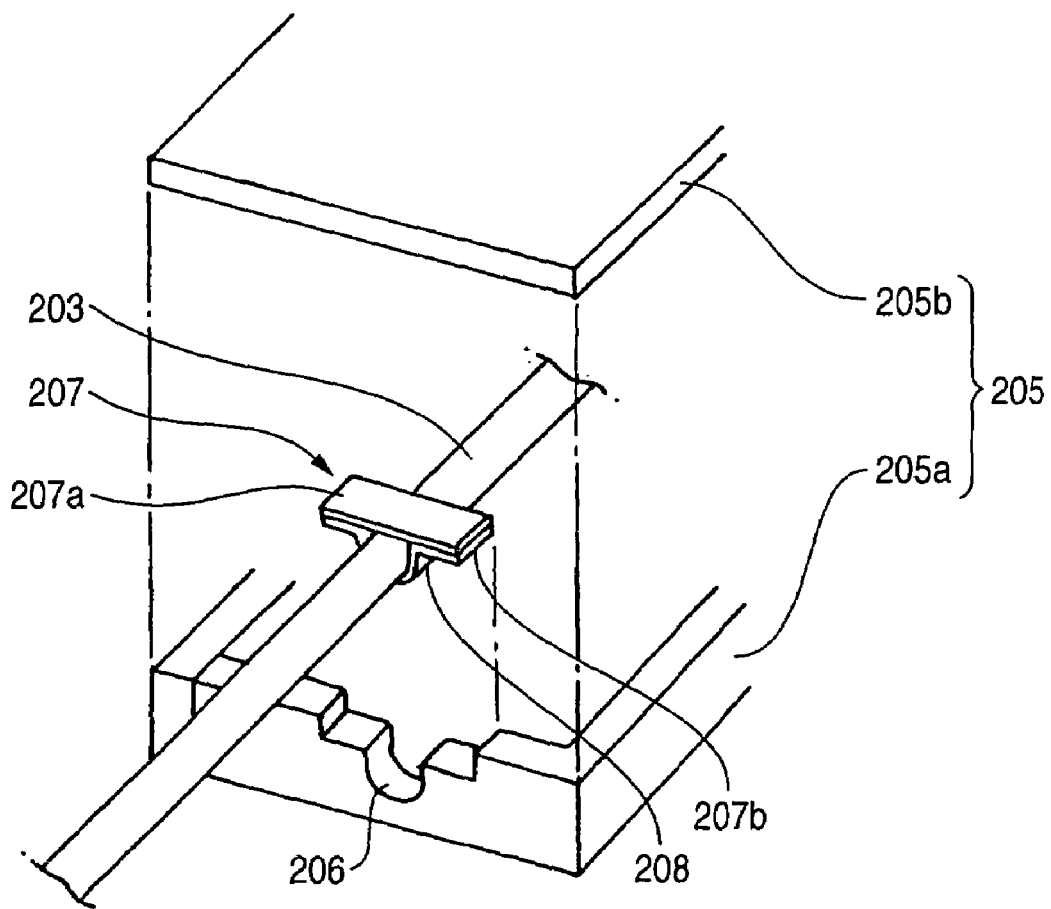
FIG. 25 is an exploded, perspective view explanatory of a related grommet and a waterproof box.

As shown in FIGS. 20 and 21, a weather strip 241 is mounted on that surface of the lid 233 facing the box body 231, and this weather strip 241 is pressed against the seal surface 234 formed at the one end portion of the box body 231, a seal surface 240 formed at the other end portion of the box body 231, and seal surfaces (not shown) formed respectively at opposite side portions of the box body.

Retaining portions 243 for retaining engagement respectively with a plurality of retaining projections 242 formed respectively at predetermined portions of a peripheral wall of the box body 231 are formed at a peripheral edge portion of the lid 233, the retaining portions 243 corresponding in number to the retaining projections 242.

For locating the grommet 210 in the notch portions 232 of the waterproof box 230, with the water-stop portion of the wire harness 203 gripped by the grip portion 211 of the grommet 210, first, the seal portion 213 of the grommet 210 is fitted into the concave portion 236 of the box body 231, and then the division member body 212 is pressed against the seal portion 213, and the interconnecting piece portions 221 of the lock arms 219 are retainingly engaged respectively with the retaining projections 239 formed on the box body 231.

As a result, the division member body 212 and the seal portion 213 are held in intimate contact with each other, and are completely combined together without shaking, and at the same time the grommet 210 is fixed to the concave portion 236 of the box body 231 without shaking. In this fixed condition, the outer surface of the division member body 212 on which the bulged portion 214 is formed lies generally flush with the seal surface 234 of the box body 231.

Then, the lid 233 is attached to the box body 231 to close the upper opening thereof, so that the weather strip 241, mounted on the lid 233, is pressed against the seal surface 234 formed at the one end portion of the box body 231, the upper surface of the division member body 212 of the grommet 210, the seal surface 240 formed at the other end portion of the box body 231, and the seal surfaces formed respectively at the opposite side portions of the box body 231. In this condition, the plurality of retaining portions 243, formed at the peripheral edge portion of the lid 233, are retainingly engaged respectively with the retaining projections 242 formed on the box body 231, thereby fixing the lid 233 to the box body 231, and as a result the grommet 210 is located at the notch portions 232 of the waterproof box 230.

When the grommet 210 is located at the notch portions 236 of the waterproof box 230, the waterproof ribs 331, formed on the bottom surface of the seal portion 213 of the grommet 210, form a seal between the seal portion 213 and the concave portion 236 of the box body 231, and also the waterproof members of the soft material or the like, each interposed between the opposed surfaces of the corresponding plate member 224 of the seal portion 213 and division member body 212, form a seal between the grommet 210 and the wire harness 203, and further the weather strip 241 forms a seal between the seal surface 234 of the box body 231 and the corresponding portion of the lid 233, a seal between the upper surface of the division member body 212 and the corresponding portion of the lid 233, a seal between the seal surface 240 (formed at the other end portion of the box body 231) and the corresponding portion of the lid 233, and a seal between each of the seal surfaces (formed respectively at the opposite side portions of the box body 231) and the corresponding portion of the lid 233. With respect to the water-stop portion of the wire harness 203, this water-stop portion is deformed within the grip portion 211 of the grommet 210, so that the water-stop agent is positively filled uniformly in the interstices between the wires 3a, and therefore the water-stop portion is sealed.

In FIGS. 18 and 19, tongue portions 250 and 251 extend outwardly from the division member body 212 and the seal portion 213, respectively, and the tongue portions 250 and 251 hold the outer peripheral surface of the wire harness 203, extending from the waterproof box 230, therebetween, and a tape or the like is wound on these tongue portions 250 and 251.

As is clear from the foregoing description, in the grommet 210, even when the waterproof member of a soft material or the like is not interposed in the predetermined position or the predetermined shape between the division member body 212 and the seal portion 213, the desired waterproof effect can be achieved by correcting the position and posture of the waterproof member with the hands of the operator in the mutually-combined condition of the division member body 212 and seal portion 213 or by self-restoring of this waterproof member into its original shape because of its elastic restoring force. Therefore, the efficiency of the operation for combining the division member body 212 and the seal portion 213 together can be enhanced.

Therefore, this grommet 210 solves the problem encountered with the related grommet in which the efficiency of the operation for combining the division member body 207a and the seal portion 207a together is low.

The grommet of the invention is not limited to the above third embodiment, and suitable modifications and improvements can be made.

For example, in the above embodiment, the retaining piece portions 217 of the retaining members are formed on the division member body 212 while the retaining portions 229 of the retaining members are formed on the seal portion 213. However, the retaining portions 229 of the retaining members may be formed on the division member body 212 while the retaining piece portions 217 of the retaining members may be formed on the seal portion 213.

In the above embodiment, the lock arms 219 of the fixing members are formed on the division member body 211 while the retaining projections 239 of the fixing members are formed on the box body 231 of the waterproof box 230. However, the retaining projections 239 of the fixing members may be formed on the division member body 212 while the lock arms 219 of the fixing members may be formed on the box body 231 of the waterproof box 230.

The material, shape, dimensions, form, number, mounting position, etc., of the wires, water-stop agent, adhesive tape, water-stop portion, wire harness, grip portion, first and second division members, retaining members, fixing members and waterproof box, illustrated in the above embodiment, are arbitrary, and are not limited in so far as the present invention can be achieved.

What is claimed is:

1. A grommet for holding an elongated member, comprising:
   a first resin-molded division member; and
   a second resin-molded division member for mounting on the first resin-molded division member,
   wherein each of the first and second resin-molded division members includes a polyamide resin;
   wherein an elastic seal member, including an elastomer, is integrally formed on at least one of the first and second resin-molded division members by insert molding; and
   wherein the grommet includes a joining portion which attaches the elastic seal member to the at least one resin-molded division member so as to prevent separation therefrom.

2. The grommet as set forth in claim 1, wherein the joining portion includes a through hole formed in the at least one division member, and a portion of the elastic seal member which extends through the through hole, and is fixed to the one division member.

3. The grommet as set forth in claim 1, wherein the grommet is fitted in an opening portion formed in a waterproof box including a box body and a lid; and
 wherein when the grommet is fitted in the opening portion notched in an end edge of an opening of the box body, the elongated member is passed through the opening portion in a sealed condition.

4. A grommet for the passage of a wire harness therethrough, comprising:
 a first dividing body,
 a second dividing body which has a waterproof rib;
 a box body which has a notch opening portion, and in which the first and second dividing bodies are provided thereon;
 a lid member which has a pressing projection, and which fits on the box body;
 wherein a peripheral wall portion is provided on a vicinity of the notch opening portion of the box body; and
 said waterproof rib, abutting against a peripheral wall portion of an upper edge portion of the box body which defines opposite ends of the notch opening portion,
 wherein when the lid member is fitted on the box body, the pressing projection presses the waterproof rib with respect to the peripheral wall.

5. The grommet as set forth in claim 4, wherein the waterproof rib extends in a direction of mounting of the wire harness onto the grommet.

6. A grommet for holding a wire harness, comprising:
 a first division member;
 a second division member;
 a retaining member, retaining the first division member to the second division member so that opposed portions of the first and second division members are spaced from each other; and
 a fixing member, retaining the first division member to a mounting member,
 wherein when the fixing member retains the first division member to the mounting member, the first and second division members are fixed in an integrally-connected manner to the mounting member so that the opposed portions of the first and second division members are held in intimate contact with each other.

7. The grommet as set forth in claim 6, wherein the mounting member is a waterproof box receiving one end portion of the wire harness.

8. The grommet as set forth in claim 6, wherein the retaining member includes a retaining portion formed on one of the opposed portions of the first and second division members, and a retaining piece portion formed on the other opposed portion; and
 wherein the fixing member includes a lock arm extending from one of an outer face of the first division member and the mounting portion beyond the second division member, and a retaining projection which is formed on the other of the outer face of the first division member and the mounting portion so as to be engaged with the lock arm.

9. A grommet mounting structure, comprising:
 a wire harness;
 a grommet, including a first division member and a second division member for holding the wire harness; and
 a waterproof box, to which the grommet is fixed,
 wherein the grommet includes:
  a retaining member which retains the first and second division members so that opposed portions of the first and second division members are spaced from each other; and
  a fixing member which retains the first division member to a mounting member; and
  wherein when the fixing member retain the first division member to the mounting member, the first and second division members are fixed in an integrally-connected manner to the mounting member so that the opposed portions of the first and second division members are held in intimate contact with each other.

* * * * *